United States Patent
Porras et al.

(10) Patent No.: US 10,050,868 B2
(45) Date of Patent: Aug. 14, 2018

(54) MULTIMODAL HELP AGENT FOR NETWORK ADMINISTRATOR

(71) Applicant: SRI International, Menlo Park, CA (US)

(72) Inventors: Phillip A. Porras, Cupertino, CA (US); Jeffrey Klaben, San Jose, CA (US); Patrick D. Lincoln, Woodside, CA (US); Nicholas Chapin, Mountain View, CA (US)

(73) Assignee: SRI International, Menlo Park, CA (US)

( * ) Notice: Subject to any disclaimer, the term of this patent is extended or adjusted under 35 U.S.C. 154(b) by 67 days.

(21) Appl. No.: 14/807,782

(22) Filed: Jul. 23, 2015

(65) Prior Publication Data

US 2016/0219078 A1 Jul. 28, 2016

Related U.S. Application Data

(60) Provisional application No. 62/108,175, filed on Jan. 27, 2015, provisional application No. 62/104,517, filed on Jan. 16, 2015.

(51) Int. Cl.

| | |
|---|---|
| *G06F 17/00* | (2006.01) |
| *H04L 12/707* | (2013.01) |
| *H04L 12/24* | (2006.01) |
| *G06F 3/0484* | (2013.01) |
| *H04L 29/06* | (2006.01) |
| *G06F 8/34* | (2018.01) |

(52) U.S. Cl.
CPC .......... *H04L 45/22* (2013.01); *G06F 3/0484* (2013.01); *H04L 41/12* (2013.01); *H04L 41/14* (2013.01); *H04L 41/22* (2013.01); *H04L 63/1416* (2013.01); *H04L 63/1491* (2013.01); *G06F 8/34* (2013.01); *G06F 2203/0381* (2013.01)

(58) Field of Classification Search
CPC . H04L 63/1416; H04L 63/1491; H04L 63/20; H04L 41/22; H04L 45/22; G06F 3/0484; G06F 3/04842; G06F 3/167; G06F 2203/0381; G06F 9/4443
USPC ....................................................... 726/1, 3
See application file for complete search history.

(56) References Cited

U.S. PATENT DOCUMENTS 7,890,869 B1 2/2011 Mayer
8,346,563 B1 * 1/2013 Hjelm ................. G10L 15/1822
379/88.01

(Continued)

OTHER PUBLICATIONS

Senanayake, U.S. Appl. No. 14/733,899, filed Jun. 8, 2015, Office Action, dated Aug. 17, 2016.

(Continued)

*Primary Examiner* — Samson Lemma
(74) *Attorney, Agent, or Firm* — Hickman Palermo Becker Bingham LLP

(57) ABSTRACT

Network management technology as disclosed herein generates and dynamically updates an intuitive, interactive visualization of a computer network in live operation. The network management technology interprets human user interactions, such as gestures, conversational natural language dialog, and combinations of gestures and natural language dialog, as network directives. The technology can implement the network directives to, for example, facilitate analysis of network activity or to respond to network security events.

20 Claims, 12 Drawing Sheets

(56) References Cited

U.S. PATENT DOCUMENTS

| | | | |
|---|---|---|---|
| 8,650,492 B1* | 2/2014 | Mui | G06F 17/30873 |
| | | | 715/736 |
| 9,026,840 B1* | 5/2015 | Kim | G06F 21/552 |
| | | | 714/4.3 |
| 9,088,615 B1 | 7/2015 | Avlasov | |
| 9,135,914 B1* | 9/2015 | Bringert | G06F 3/0488 |
| 2006/0010485 A1* | 1/2006 | Gorman | G06F 21/57 |
| | | | 726/3 |
| 2007/0136788 A1 | 6/2007 | Monahan | |
| 2010/0199228 A1 | 8/2010 | Latta | |
| 2011/0010633 A1* | 1/2011 | Richmond | H04L 41/12 |
| | | | 715/736 |
| 2011/0246897 A1* | 10/2011 | Lee | G06Q 10/10 |
| | | | 715/735 |
| 2013/0290520 A1 | 10/2013 | Noo | |
| 2013/0329552 A1 | 12/2013 | Carnero | |
| 2013/0346168 A1 | 12/2013 | Zhou | |
| 2014/0059641 A1 | 2/2014 | Chapman | |
| 2014/0123211 A1 | 5/2014 | Wanser | |
| 2015/0128274 A1* | 5/2015 | Giokas | H04L 63/1425 |
| | | | 726/23 |
| 2015/0149620 A1 | 5/2015 | Banerjee | |
| 2015/0279366 A1* | 10/2015 | Krestnikov | G10L 15/26 |
| | | | 704/235 |
| 2016/0028616 A1 | 1/2016 | Vasseur | |
| 2016/0080221 A1 | 3/2016 | Ramachandran | |

OTHER PUBLICATIONS

Senanayake, U.S. Appl. No. 14/733,907, filed Jun. 8, 2015, Office Action, dated Jul. 12, 2017.

Senanayake, U.S. Appl. No. 14/733,907, filed Jun. 8, 2015, Interview Summary, dated Jun. 14, 2017.

Senanayake, U.S. Appl. No. 14/733,907, filed Jun. 8, 2015, Final Office Action, dated Mar. 17, 2017.

Senanayake, U.S. Appl. No. 14/733,899, filed Jun. 8, 2015, Final Office Action, dated Mar. 17, 2017.

Porras, U.S. Appl. No. 14/807,826, filed Jul. 23, 2015, Interview Summary, dated Jul. 28, 2017.

Porras, U.S. Appl. No. 14/824,891, filed Aug. 12, 2015, Office Action, dated Oct. 19, 2017.

Porras, U.S. Appl. No. 14/807,826, filed Jul. 23, 2015, Final Office Action, dated Oct. 13, 2017.

Porras, U.S. Appl. No. 14/824,891, Filed Aug. 12, 2015, Final Office Action dated May 18, 2018.

Porras, U.S. Appl. No. 14/807,826, Filed Jul. 23, 2015, Office Action dated May 31, 2018.

* cited by examiner

MULTIMODAL HELP AGENT FOR NETWORK ADMINISTRATOR

CROSS-REFERENCE TO RELATED APPLICATIONS

This application claims the benefit of and priority to U.S. Provisional Patent Application Ser. No. 62/108,175, filed Jan. 27, 2015, and U.S. Provisional Patent Application Ser. No. 62/104,517, filed Jan. 16, 2015, each of which is incorporated herein by this reference in its entirety.

Examples of technology that may be used to implement various aspects of the present invention are described in greater detail in at least the following other patent applications of SRI International: U.S. Utility patent application Ser. No. 14/733,899 filed Jun. 8, 2015 ("Visually Intuitive Interactive Network Defense"); U.S. Utility patent application Ser. No. 14/807,826 filed Jul. 23, 2016 ("Natural Language Dialog-Based Help Agent for Network Administrator"); and U.S. Utility patent application Ser. No. 14/824,891 filed Aug. 12, 2015 ("Impact Analyzer for a Computer Network").

BACKGROUND

This disclosure relates to the technical field of computer network operations, management, and security. Computer networks are at risk of a variety of different types of attacks. For example, a network intruder or malicious software may intercept data communications traveling through the network, or initiate commands that disrupt the networks normal operation. Some commonly known types of network attacks include wiretapping, port scanners, idle scans, denial-of-service attacks, spoofing, and cyber-attacks. Traditionally, a network is secured by a implementing a well-defined security policy that is instantiated for the particular network topology. In traditional network environments, the security policy is often deployed and enforced statically and consistently across the entire network infrastructure.

Software-defined networking refers to an approach for building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
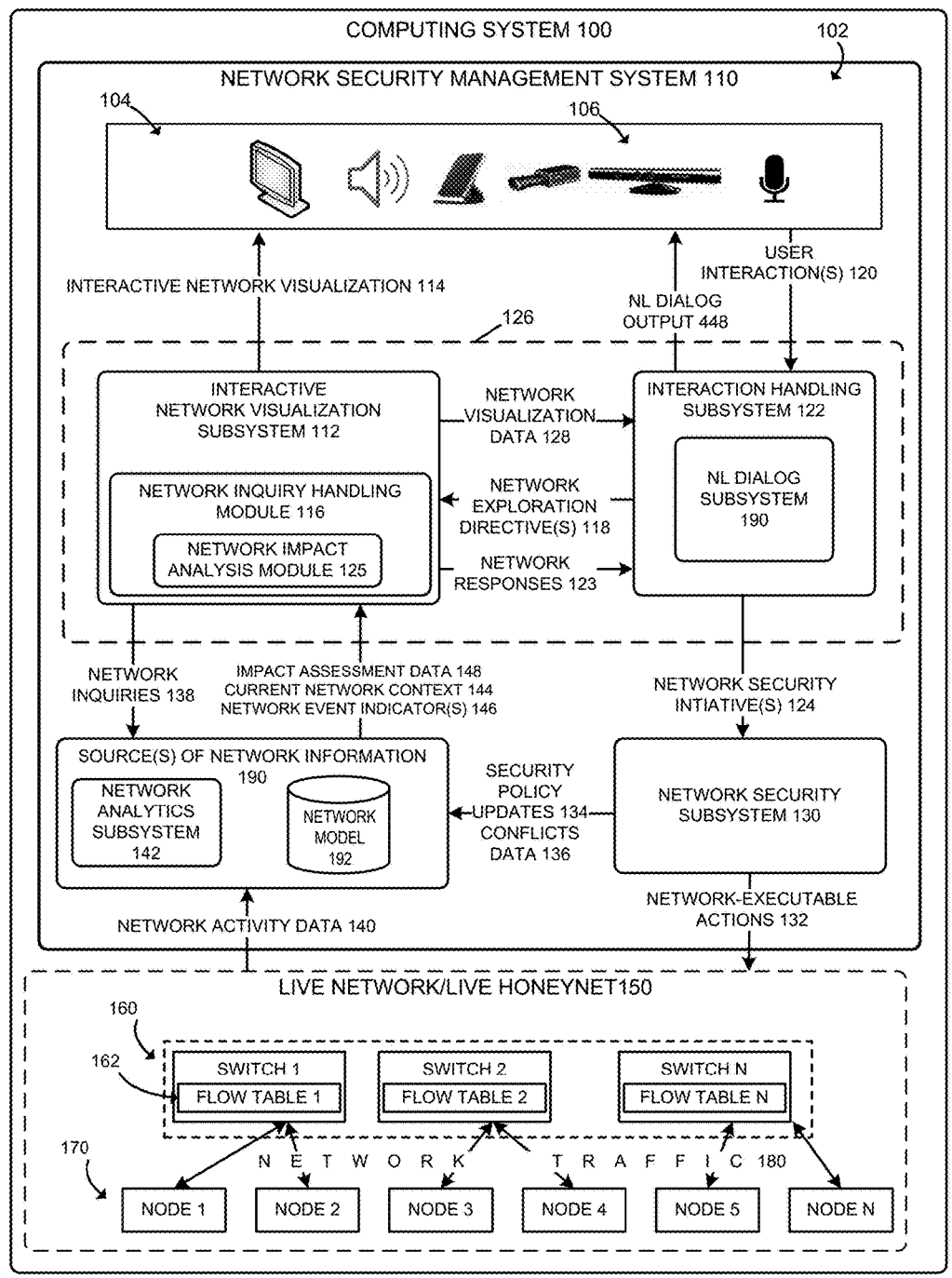
FIG. 1 is a simplified schematic diagram of at least one embodiment of an environment of a computing system, including a network security management system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Network security management often requires administrators to review and analyze large amounts of network data in order to identify suspicious behavior or network threats. The voluminous data makes it difficult for humans or computers to quickly extract meaningful insights. To the extent that network visualization tools are available, mechanisms for initiating remedial or preventative measures are not well integrated with such tools. As a result, network managers suffer from a complexity burden, which slows their ability to identify problems on the network and implement effective measures to combat those problems.

Dynamically programmable networks, some embodiments of which may be referred to as software-defined networks or SDNs, can enable a flexible and adaptable network infrastructure, but also present new and unique challenges to the effective enforcement of traditional security policies. Along with its many benefits, SDN technology can create new, unintended opportunities for determined adversaries to invade and subvert network operations by dynamically reprogramming and manipulating the behavior of the network switching infrastructure.

Referring to FIG. 1, a network security management system 110 for visualizing cyber-threats against a computer network and for interactive reconfiguration of the network responsive to those threats through natural language dialog is disclosed herein. The system 110 includes components that receive digital alerts over time regarding current network activity and flows, and detected or suspected cyber-threats. Components of the system 110 generate an interactive display for a human user, based on those alerts, thereby presenting a real-time visual depiction of the network, and of the current activity, flows, and cyber-threats. Components of the system 110 are designed to conduct conversational natural language dialog with a human user, including to receive natural language requests for one or more desired courses of action to remediate network threats. The requests are expressed in a high-level manner, intuitive to the human user, relative to the visual depiction, and need not specify the detailed network instructions to perform the network reconfiguration that may be necessary to implement the desired courses of action. The components of the system 110 respond to the high-level requests by generating a set of formal digital instructions that corresponds to a desired course of action. The system 110 further includes actuation components that are designed to implement the network reconfigurations specified by the network-executable instructions. An exemplary system is described in the context of a secure software-defined network environment; however, in other embodiments, the disclosed technology is implemented in other (e.g., non-SDN) network environments. In some embodiments, aspects of the disclosed system 110 can be used for purposes other than network security, e.g., for network operations management more generally. For example, the objective of an interaction conducted by the system 110 may be to improve the performance or reliability of the network 150 rather than to respond to or protect against network threats.

The NL processing front-end can be integrated with a touch and/or gesture-based front-end, such as described in U.S. Provisional Patent Application 62/104,517, of SRI International, thereby supporting multi-modal interaction combining verbal and nonverbal user input. A user could, for example, point to a particular area of the visualization display and say: "quarantine those nodes" or "what applications are affected if we disconnect this node?" The disclosed network security management architecture thereby enables a human security administrator to use intuitive, natural language dialog in order to, for example, explore network threats and infections, as well as to dictate effective remedial responses that cause reconfiguring of network flows in a secure manner so as to mitigate the identified threats or infections.

In FIG. 1, an embodiment of the network security management system 110 is embodied in one or more computing devices of a networked computing system 100. In the illustrative embodiment, the network security management system 110 establishes an environment 102 during operation (e.g., a native or virtual execution or "runtime" environment). The illustrative environment 102 includes an interactive network visualization subsystem 112, an interaction handling subsystem 122, a network security subsystem 130, and a number of sources of network information 190 (including a network analytics subsystem 142 and a network model 192). In some embodiments, the interactive network visualization subsystem 112 and the interaction handling subsystem 122 may be embodied as components of a user interface subsystem which may include a game engine 126. The game engine 126 may operate the visualization 114 using a video gaming paradigm. Each of the interactive network visualization subsystem 112, the interaction handling subsystem 122, the network security subsystem 130, and the network analytics subsystem 142 is embodied as computer software, firmware, hardware, or a combination thereof. For example, any of the components of the network security management system 110 may be embodied as software written in a programming language such as Java, C++ and/or Python. As used herein, "component," "module," "instruction," "subsystem," "system," or similar terminology may refer to one or more units of computer code, for example, computer programs or instructions embodied in one or more non-transitory machine accessible storage media.

The network security management system 110 interfaces with a live network or live honeynet ("network") 150. As used herein, "network" may refer to a computer network that is managed by one or more human network administrator(s). The illustrative network 150 is implemented as a packet-switching digital communications network. As used herein, "packet" may refer to, among other things, a data packet, a network packet, a set of data and/or control communications, or portions of such communications, which are transmitted between nodes or otherwise travel on the network 150.

The network 150 may be configured as a public, private or semi-private wired or wireless network defined by a network boundary, where the network boundary may establish a firewall between the network and one or more external networks, such as other private or semi-private networks or public networks, e.g., the Internet. As used herein, "node" may refer to any type of computing device, peripheral component, or other electronic device (e.g., a smart appliance) that is connected to the network 150, including client machines and servers. An "internal node" may refer to a node that is within the boundary of the network 150, while an "external node" may refer to a node that is outside the network boundary, such as a cloud server or other computer to which one or more internal nodes can be connected via the Internet.

In some embodiments, the network 150 may be implemented as a dynamically programmable computer network, e.g., using a software-defined networking approach (such as the OPENFLOW protocol). In some embodiments, the network 150 may correspond to a physical or logical (e.g., virtualized) subset of a larger network, such as a "network slice." In some embodiments, the network 150 or portions of the network 150 may be embodied as a honeynet. As used herein, "honeynet" may refer to a network or simulated network that is configured for security purposes. For example, a honeynet may appear to be a legitimate network but intentionally set up with security vulnerabilities in order to invite attacks, so that attack activities and their perpetrators can be identified and analyzed in order to improve network security.

The network security management system 110 generates an interactive network visualization 114 based on network activity data 140 and other information, as described in more detail below. As used herein, "visualization" may refer to the use of computer graphics techniques to present information visually. For example, the visualization 114 may include two-dimensional and/or three-dimensional graphics, images, videos, diagrams, animations, text, audio (e.g., non-speech sounds and/or speech), other forms of multimedia content, or a combination thereof. The illustrative visualization 114 is dynamically adjustable in that the content or presentation of the visualization can change to reflect activities and events that occur on the network 150 during live operation. The illustrative visualization 114 is also interactive in that the view of the visualization 114 that is presented to the user can change in response to user interactions 120, such as queries and view manipulations, as described in more detail below. For example, the point of reference from which the visualization 114 is presented can be changed and/or the level of detail of the information presented in the visualization 114 can be dynamically adjusted, in order to facilitate intuitive user exploration of the network 150.

The network security management system 110 presents the interactive network visualization 114 to a network administrator (e.g., a human network security manager or "user") by way of one or more user interface devices 104. As used herein, the term "network administrator" may refer to a human operator and/or a computerized agent or delegate of a human operator, such as a software application that acts under the direction of or in response to inputs from the human operator. As such, the network security management system 110 or portions thereof may be implemented as a network security software application. The user interface device(s) 104 may be embodied as, for instance, a touchscreen display device, such as may be implemented in a smart phone, desktop, laptop, or tablet computer), a wearable computing device (e.g., smart glasses, augmented reality or virtual reality goggles, or a heads-up display), a computer monitor, a television, a projection system, or another type of display device. In the illustrative embodiments, one or more of the user interface device(s) 104 includes audio input and output devices capable of capturing and recording human conversational spoken natural language input and outputting system-generated conversational spoken natural language output (such as microphones, speakers and headphones or earbuds). As described in more detail below, the system 110 can engage in a conversational natural language dialog with the user. In some embodiments, the system 110 is configured to provide a multimedia user experience (e.g. sound and/or music in combination with the visualization 114).

The network security management system 110 interfaces with one or more user interaction detection devices 106, which are configured to detect and capture user interactions 120 made by the user in relation to the interactive network visualization 114. The user interaction detection device(s) 106 may include the interactive display device 104 and/or other human activity detection devices (e.g., various types of sensors, including motion sensors, kinetic sensors, proximity sensors, thermal sensors, pressure sensors, force sensors, inertial sensors, cameras, microphones, gaze tracking systems, and/or others). The types of user interactions 120 captured by the user interaction detection device(s) 106 can include "contact-free" gestures (e.g., hand waves, pointing, clapping, head nods or head tilts, etc., made at a distance away from the display device 104), touch-based gestures (e.g., taps, swipes, pinching, circling, etc., in contact with the display device 104), vocal utterances (e.g., natural language dialog speech, including queries and commands), gaze focus, location and/or duration, and/or other types of human activity, or a combination of different types of human activity (e.g., a temporal sequence or contemporaneous occurrence of gesture and voice audio).

The illustrative network security management system 110 interprets the user interactions 120 and converts the user interactions 120 to network exploration directives 118 and/or network security initiatives 124. As used herein, "network security initiative" may refer to a "high level," e.g., semantic, description of a network security action that the user desires to be implemented on the network 150. As such, "high level" may refer to a higher level of abstraction than, e.g., device-readable computer code. For example, a network security initiative 124 may be embodied as a natural language instruction such as "block communications originating at this node" or "quarantine that node." As used herein, "network exploration directive" may refer to a description of an action that the user desires to be implemented by the interactive network visualization subsystem 112 with respect to a current view of the visualization 114. For instance, a network exploration directive 118 may be embodied as a natural language instruction such as "zoom in to that subnet" or "rotate this view by 45 degrees," or as one or more device-level instructions corresponding to a higher-level directive. Other examples of network exploration directives 118 involve querying the system 110 for specific data, for example, to request that the visualization 114 display additional details about the current behavior of a network flow or node. In some embodiments, network exploration directives 118 and/or network security initiatives 124 may be implemented directly as device-executable instructions. For example, in some embodiments, portions of the network security subsystem 130 that convert "higher-level" network security initiatives 124 to "lower-level" network security directives (as described below) may be omitted, as the network security initiatives 124 may themselves constitute lower-level network security directives or device-executable instructions.

When the network security management system 110 interprets a user interaction 120 as a network exploration directive 118, the system 110 may utilize a network inquiry handling module 116 to generate a network inquiry 138 and/or proceed to manipulate at least a portion of the view of the interactive network visualization 114 in accordance with the particulars (e.g., arguments or parameters) of the network exploration directive 118. When the network security management system 110 interprets a user interaction 120 as a network security initiative 124, the illustrative system 110 translates the network security initiative 124 to one or more network security directives. As used herein, a "network security directive" may refer to an action to be taken in furtherance of the operation, management, or security of the network 150, and may include one or more network-executable actions 132 and/or security policy updates 134. As used herein, "network-executable actions" may refer to, e.g., device-executable instructions, such as computer code or executable scripts, which can be implemented by one or more devices on the network 150 to perform, for example, a diagnostic or remedial action in response to a detected infection or other type of network threat. For example, a network-executable action 132 may be embodied as a set of network flow rules that can be instantiated at one or more network switches 160. As used herein, "security policy update" may refer to an automated or manually-effectuated mechanism by which a security policy for the network 150 can be dynamically updated (by, e.g., reconfiguring a rule, instantiating a new rule, populating a data structure, changing a data value in a database or table, executing computer code, etc.).

By presenting the voluminous and complex network data as an intuitive visualization and enabling interaction with the visualization via natural human interactions such as gestures, gaze, and/or conversational spoken natural language dialog, the network security management system 110 can greatly simplify the network management tasks of the human administrator. The system 110's ability to system-generate context-relevant natural language output (and thereby converse with the user by conversational spoken natural language dialog) allows the system 110 to present complicated network data in an easy to understand conversational form that can greatly enhance the user experience, reduce network administrator fatigue. The underlying dialog translation architecture translates the conversational natural language dialog to device-executable instructions in an automated fashion, thereby having the potential to increase the network administrator's responsiveness to network events and reduce the risk of human error in the implementation of network security initiatives.

Some embodiments of the network security management system 110 specifically leverage the dynamic nature of the SDN architecture by, for example, converting the user interactions 120 to sets of instructions that can be implemented directly by switching devices on the network 150 (e.g., to dynamically reconfigure the data plane or the behavior of the switches).

Referring now in more detail to the components of the embodiment of the network security management system 110 shown in FIG. 1, the illustrative network 150 includes a plurality of network switching devices 160 (e.g., switch 1, switch 2, switch "N," where "N" is a positive integer) and a plurality of nodes 170. The network switching devices 160 each may be embodied as, for example, a switch, a router, a load balancer, a learning switch, or another type of network device. Each of the nodes 170 may be embodied as any suitable type of computing resource, e.g., client device, a server computer, group of server computers, or one or more other devices that are configured to communicate with the switches 160 to send and receive data packets over the network 100. For simplicity, the illustrative network 150 is shown with a fixed number of nodes 170 per switch 160; however, the network 150 may include any number of nodes 170 in communication with any number of switches 160.

Figure 2:
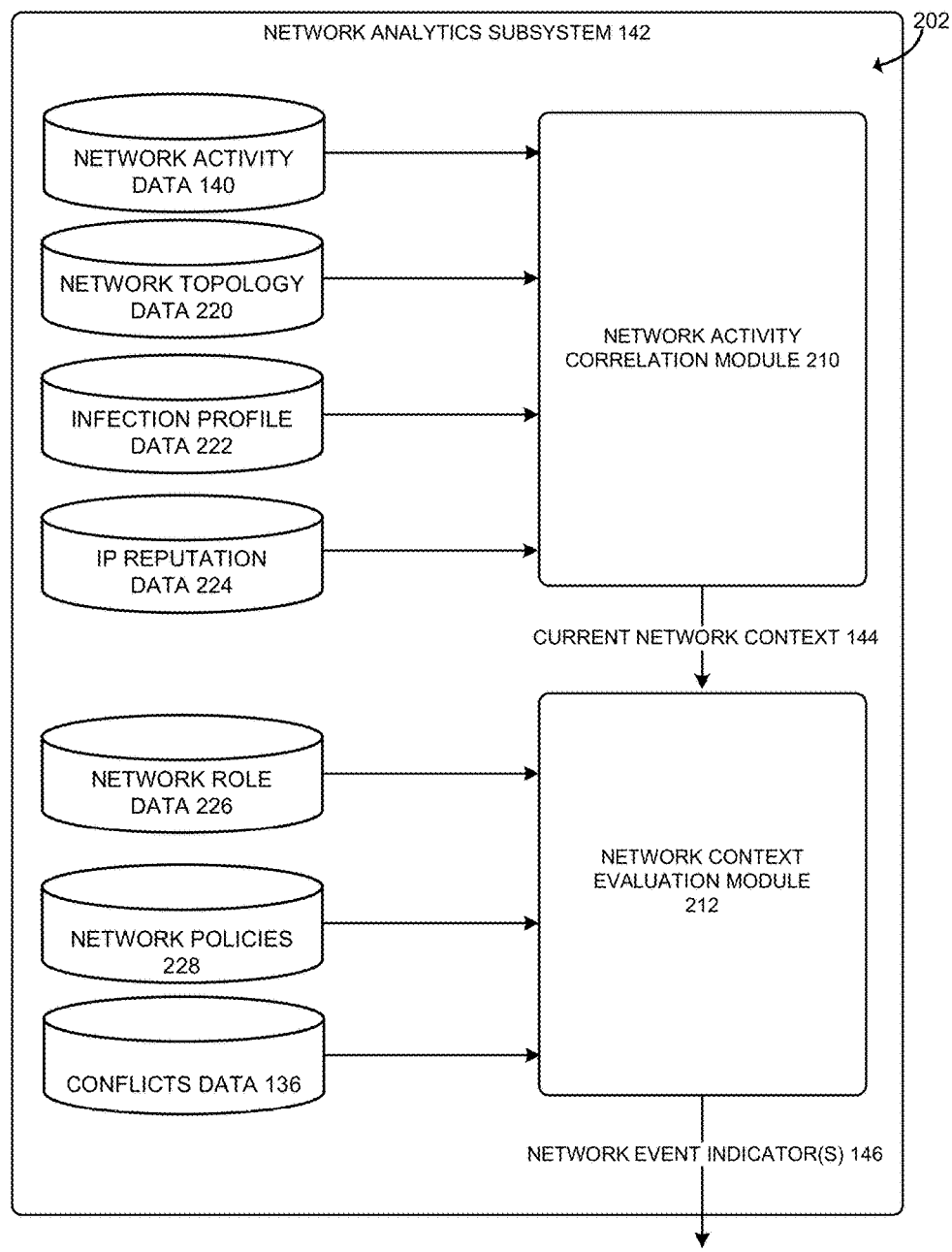
FIG. 2 is a simplified schematic diagram of at least one embodiment of an environment that may be established by a network analytics subsystem of the network security management system of FIG. 1.

The switches 160 each communicate with one or more of the nodes 170 to effectuate the flow of network traffic 180 across the network 150 in accordance with a network security policy or policies 228 (FIG. 2). As used herein, terms such as "network traffic" and "network flow" may refer to, in the context of the network 150, groups or sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network 150 during a certain time interval.

In a dynamically-programmable network, a security policy 228 (FIG. 2) may be implemented at the switches 160 as a number of network flow rules, which are maintained at the switches 160 in local flow tables 162 (e.g., flow table 1, flow table 2, flow table "N," where "N" is a positive integer). The local flow tables 162 are used by their respective switches 160 to instantiate flow rules at the switch 160 and direct the network traffic 180 between the nodes 170. As described in more detail below, the network-executable actions 132 produced by the network security management system 110 can, for example, add, modify, or delete flow rules stored in the local flow tables 162, e.g., to improve the security of the network 150.

During live operation of the network 150, the network components (e.g., switches 160 and nodes 170) generate network activity data 140. The network activity data 140 may be embodied as, for example, security logs, access control logs, etc. For example, the network activity data 140 may be indicative of one or more network flows identified within the network traffic 180. The network activity data 140 may include data describing attributes, statistics, counters, or other data relating to network flows, individually or collectively, within the network traffic 180. The network activity data 140 may include computed data, such as aggregate statistics describing network activity for all or a portion of the network 150 during one or more discrete time intervals. The network activity data 140 may be generated by, e.g., one or more network sensors or passive network monitoring programs.

Illustrative, non-limiting examples of network activity data 140 relating to network flows include the source and destination Internet address (e.g., the IP addresses associated with the TCP session initiator and TCP server, respectively) of the flows, the source and destination port, protocol (e.g., TCP or UDP (User Datagram Protocol), start time, end time, or duration. The network activity data 140 may include statistical information on data transferred, including the number of zero-length packets sent by the client or the server, the number of nonzero-length packets (i.e., data packets) sent by the client or the server, the total number of bytes produced by the client or the server, the total number of packets produced by the client or the server, or the average size of data packets produced by the client or the server. The network activity data 140 may include geographical data associated with the endpoints (i.e., the client and server) of the network flows. The geographical data may include any data describing the physical location of an endpoint, such as the country name, country code, city, or geographical coordinates. The geographical data may be described using, for example, an IP geolocation database such as MaxMind® GeoIP®. The network activity data 140 may include domain names associated with the endpoints of the identified network flows. In some embodiments, the network flows may be associated with domain names observed in a DNS (Domain Name System) query.

The illustrative interactive network visualization subsystem 112 issues network inquiries 138 (e.g., processor-executable queries) to obtain information about the network 150 from one or sources of network information 190. Illustratively, the sources of network information 190 include the network analytics subsystem 142 and a network model 192. The illustrative network analytics subsystem 142 is embodied as one or more components or modules that analyze the network activity data 140 over time to determine network flow characteristics and node behaviors that may indicate the existence of a network infection or some other type of network threat. The network analytics subsystem 142 generates data indicative of a past, present, or future network context (e.g., current network context 144) and, particularly when an infection or threat is detected, one or more network event indicators 146. As used herein, "current network context" may refer to data indicative of a current state of the network 150 in which data communications are taking place. The network activity data 140 may include historical records of network activity and/or predictive models.

The data generated by the network analytics subsystem 142 may be diagnostic or predictive. For example, the current network context 144 may include data indicative of the number of local nodes 170, the hardware or software configuration of the nodes 170, the endpoints and directions of network flows (where an "endpoint" may be, for example, an internal node or an external node), duration of connections between two endpoints, flow volume, patterns of network flows, patterns of node behavior, security threats detected, infections detected, nodes currently involved in or likely to be affected by security threats or infections, and/or other network activity. Some illustrative, non-limiting examples of technology available from SRI International that may be utilized by the network analytics subsystem 142 to analyze current network conditions, diagnose infections, identify network threats, or predict network events, are described in U.S. Pat. No. 8,955,122 ("Method and Apparatus for Detecting Malware Infection"); U.S. Patent Application Publication No. 2009/00064332 ("Method and Apparatus for Generating Highly Predictive Blacklists"); and U.S. Patent Application Publication No. 2014/0331280 ("Network Privilege Manager for a Dynamically Programmable Computer Network"), all of SRI International. An embodiment of the network analytics subsystem 142 is described in more detail below, with reference to FIG. 2.

The illustrative network model 192 is embodied as, for example, a computer data structure or searchable knowledge base, which is stored in memory of the computing system 100. The network model 192 comprises information about the network architecture, the mission or business objective(s) of the network 150, entities connected to the network (e.g., high level information about nodes and links, such as user names, roles, geographic locations, business purposes for the network, and applications running on different devices). Portions of the network model 192 may specify conceptual layers of the network protocol stack according to a reference model, such as the Department of Defense (DoD) or Open Systems Interconnection (OSI) model. As such, portions of the network model 192 may contain a graphical, numerical, textual, algorithmic, or mathematical representation of the manner in which communications across the network are handled. Portions of the network model 192 may provide an abstracted view of the network 150 that is independent of implementation details.

The illustrative interactive network visualization subsystem 112 is embodied as one or more components or modules that convert the data retrieved from or supplied by the source(s) of network information 190 (e.g., data indicative of the current network context 144, the network event indicators 146, and/or the impact assessment data 148), which may be output by the network analytics subsystem 142 or supplied by the network model 192, for use by the interactive network visualization 114. For example, components of the interactive network visualization subsystem 112 may be embodied in software using commercially available data visualization software, such as a publicly available runtime library or toolkit.

The network visualization subsystem 112 includes the network inquiry handling module 116. The illustrative network inquiry handling module 116 is configured to generate network inquiries 138 as needed to obtain data such as the current network context 144, network event indicators 146, and impact assessment data 148 from the source(s) of network information 190 (e.g., the network analytics subsystem 142 and/or the network model 192). The network inquiries 138 are embodied as executable queries that are formatted according to the requirements of the respective component of the source(s) of network information 190 (e.g., the network analytics subsystem 142 and/or the network model 192). For example, in some embodiments, the source(s) of network information 190 (e.g., the network analytics subsystem 142 and/or the network model 192) may include a suite of different software components that each perform different data collection, network diagnostic or analytics functions (e.g., one or more software products such as Arcsight, SourceFire, BotHunter, Qualys, firewalls, routers, intrusion detection systems, etc.), and the network inquiry handling module 116 may translate a network exploration directive 118 into a query format that is usable by one or more of these software components (e.g., CISCO restAPIs, nmap arguments, qualys scanner arguments, SDN infrastructure arguments, third party alert database query formats and/or network flow analytics query formats).

As an illustrative example, where the interaction handling subsystem 122 determines that a user interaction 120 includes a pointing gesture directed at a specific on-screen element of the visualization 114, the network visualization subsystem 112 may receive, from the interaction handling subsystem 122, a network exploration directive 118 that identifies (e.g., as an argument), the network component represented by the pointed-to on-screen element (e.g., a current node, switch, or data flow of the network 150). In this case, the network inquiry handling module 116 may determine the relevant components of the network analytics subsystem 142 to query in order to provide the requested data, translate the network exploration directive 118 into a set of network inquiries 138 including one or more structured commands to be executed by the relevant components of the network analytics subsystem 142, and forward the network inquiries 138 to the respective components of the network analytics subsystem 142.

The illustrative network inquiry handling module 116 includes a network impact analysis module 125. The network impact analysis module 125 handles network exploration directives 118 that include a request for information about the potential impact of a network security initiative 124, should it be implemented by the network 150. An example of an "impact analysis" request is a "what if scenario" posed by the user. In another example, the system 110 may be configured to automatically intercept certain network security initiatives 124 and perform a network impact analysis on each intercepted network security initiative 124 before the initiative 124 is implemented by the network 150. In this case, the interaction handling subsystem 122 may formulate a network exploration directive 118 that includes the important details of the intercepted network security initiative 124 (e.g., arguments such as node identifier and command type), and the network inquiry handling module 116 may incorporate those portions of the intercepted network security initiative 124 into one or more network inquiries 138, which are sent to one or more components of the network analytics subsystem 142.

To perform the network impact analysis, the network impact analysis module 125 interfaces with one or more components of the network analytics subsystem 142 to obtain impact assessment data 148 produced in response to the network inquiries 138. For instance, the network impact analysis module 125 may provide network topology data, network role data, and/or live network traffic data, which the network analytics subsystem 142 may use to analyze the proposed network security initiative 124. As a result of its analysis of the impact assessment data 148 (which may include portions of the current network context 144 and/or network event indicators 146), the network impact analysis module 125 may assign a risk level to the network security initiative 124. For example, the risk level of a network security initiative 124 may be "high" if implementation of the network security initiative 124 by the network 150 would disconnect a server from the network 150 that hosts important data or an important enterprise-wide service like email or document management. On the other hand, the risk level of the network security initiative 124 may be "low" if the node is an individual's personal machine or mobile device. The interactive network visualization subsystem 112, e.g., the network inquiry handling module 116, may output or otherwise make available to the interaction handling subsystem 122 one or more network responses 123. The network responses 123 may include data retrieved as a result of one or more network inquiries 138 submitted by the network inquiry handling module 116 to one or more components of the source(s) of network information 190 (e.g., the network analytics subsystem 142 and/or the network model 192). The interaction handling subsystem 122 may incorporate the network responses 123, or portions thereof, into NL dialog output 448 as described in more detail below, or the interactive network visualization subsystem 112 may incorporate the network responses 123, or portions thereof, into the visualization 114.

The visualization 114 graphically depicts network links and flows, and highlights diagnosed infections and network threats. In some embodiments, such as those shown in FIGS. 7B, 7C, 7D, and 7E, the visualization 114 is implemented using a "virtual world" style interface based on a gaming visualization paradigm. In other embodiments, such as the one shown in FIG. 7A, the visualization 114 presents a simpler graphical depiction of the network 114 enhanced with intuitive icons and touch-based security mediation capabilities. In still other embodiments (not shown), the visualization 114 graphically represents relative network flow volumes using a Sankey style flow diagram in which a dimension of the graphical elements representing the flows varies according to the flow volume. For instance, the length or width of a graphical element (such as an arrow) may be larger or thicker, to represent a larger flow volume, and smaller or narrower, to represent a smaller flow volume. An embodiment of the interactive network visualization subsystem 112 is described in more detail below, with reference to FIG. 3.

The illustrative interaction handling subsystem 122 includes a natural language (NL) dialog subsystem 190. The interaction handling subsystem 122, including the NL dialog subsystem 190, is embodied as one or more hardware and/or software components or modules that detect, capture, and interpret user interactions 120 (including gesture-based interactions, natural language dialog-based user interactions, and combinations of different types of interactions), and convert the user interactions 120 to network exploration directives 118 or network security initiatives 124, as the case may be. For instance, portions of the interaction handling subsystem 122 may written in a computer programming language such as Java and/or utilize Extensible Markup Language (XML) data structures. Some illustrative, non-limiting examples of technology available from SRI International that may be utilized by the interaction handling subsystem 122 to captures and interpret user interactions are described in the following patent applications of SRI International: U.S. Patent Application Publication No. 2012/0313854 ("Adaptable Input/Output Device") and U.S. Patent Application Publication No. 2013/0311508 ("Method, Apparatus, and System for Facilitating Cross-Application Searching and Retrieval of Content Using a Contextual User Model"). Illustrative embodiments of components of the interaction handling subsystem 122 are described in more detail below, with reference to FIGS. 4A and 4B.

The illustrative network security subsystem 130 is embodied as one or more components or modules that translate the network security initiatives 124 to network-executable actions 132 or security policy updates 134, as the case may be. Some illustrative, non-limiting examples of technology available from SRI International that may be utilized by the network security subsystem 130 to convert higher-level directives (e.g., natural language descriptions of network actions) to network-executable instructions are described in U.S. Patent Application Publication No. 2014/0075519 ("Security Mediation for Dynamically Programmable Network"); U.S. Patent Application Publication No. 2014/0317684 ("Security Actuator for a Dynamically Programmable Network"); and U.S. Patent Application Publication No. 2014/0331280 ("Network Privilege Manager for a Dynamically Programmable Computer Network"), all of SRI International. An embodiment of the network security subsystem 130 is described in more detail below, with reference to FIG. 5.

Referring now to FIG. 2, an embodiment of the network analytics subsystem 142 is shown in more detail. The illustrative network analytics subsystem 142 establishes an environment 202 during operation (e.g., a native or virtual execution or "runtime" environment). The environment 202 includes a network activity correlation module 210 and a network context evaluation module 212, which interface with data stores containing the network activity data 140, network topology data 220, infection profile data 222, IP reputation data 224, network role data 226, network policies 228, and conflicts data 136. Portions of the network activity data 140, network topology data 220, infection profile data 222, IP reputation data 224, network role data 226, network policies 228, and conflicts data 136 may be received, accessed or obtained from other systems and stored in computer memory, e.g., in a searchable data structure such as a database, table, data file, or XML (eXtensible Markup Language) data structures. The components and modules shown in FIG. 2 may each be embodied as hardware, firmware, software, or a combination thereof (e.g., software written using a programming language such as Java and/or Python).

The illustrative network activity correlation module 210 is configured to determine the current network context 144, continuously or periodically at discrete time intervals. Particularly in embodiments in which the network 150 is implemented as a dynamically programmable network, the current network context 144 may be indicative of the dynamic properties of the network traffic 180; that is, the current network context 144 reflects, e.g., the current behavior of nodes 170 on the network 150 at a discrete time instance. The current network context 144 may include any data or relationship associated with the current dynamic state of the network flows within the network traffic 180. The network activity correlation module 210 may determine the current network context 144 based on any combination of network activity data 140, network topology data 220, infection profile data 222, IP reputation data 224, and/or other data.

The network activity correlation module 210 may periodically determine the current version of network activity data 140, network topology data 220, infection profile data 222, IP reputation data 224, network role data 216, and/or network policies 228, at a given time instance, and algorithmically correlate portions of such data to identify and/or network threats and infections. Such correlating may involve, for example, querying one or more of the data 140, 220, 222, 224 to determine matching attributes, executing pattern matching algorithms, etc. For example, the network activity correlation module 210 may correlate IP reputation data 224 indicating that a particular external node is on a blacklist with current network activity data 140 indicating that an internal node is currently connected to the blacklisted node. As another example, the network activity correlation module 210 may predict that an internal node may be at risk of a security attack based on its proximity in the network topology to another node that has already experienced the security attack. Illustrative, non-limiting examples of technology that can be used to correlate network threat and/or infection data with current network activity data are described in the aforementioned U.S. Pat. No. 8,955,122 ("Method and Apparatus for Detecting Malware Infection"); at www.bothunter.net; in U.S. Patent Application Publication No. 2009/00064332 ("Method and Apparatus for Generating Highly Predictive Blacklists"); and U.S. Patent Application Publication No. 2014/0331280 ("Network Privilege Manager for a Dynamically Programmable Computer Network").

The network activity data 140 may indicate, in addition to node behavior and flow information, specific details about the nodes' current activity. For instance, the network activity data 140 may identify software applications currently running on a particular node and/or connections made by those software applications. The illustrative network topology data 220 may be obtained from, e.g., a network management software system used to configure and manage the network 150, and may include data indicative of the number, type, and arrangement of nodes 170 and switching devices 160 on the network 150. For instance, the network topology data 220 may identify nodes by internet protocol (IP) address, and also indicate the device type (e.g., server, desktop, mobile device, etc.), connection type (e.g., wired, Wi-Fi, or cellular), operating system platform (e.g., Android, Windows, iOS), neighboring nodes, etc. The infection profile data 222 includes, for example, statistical information based on historical infection data, or other information which indicates typical patterns or behaviors of known infections.

The IP reputation data 224 includes a list of known malicious Internet addresses and associated data describing the malicious addresses, the type of threat, and other information relating to the trustworthiness of the malicious Internet address. For example, the IP reputation data 224 may be embodied as a large-scale network address blacklist. Alternatively or in addition, the IP reputation data 224 includes a list of Internet addresses and associated data describing addresses that are known to be acceptable or permitted in accordance with a security policy 228 (e.g., a whitelist). Collectively or individually, the various types of IP reputation data 224 may be referred to as access control data. Along with the malicious or acceptable IP address, as the case may be, the IP reputation data 224 may also identify other data associated with the IP address, such as one or more threat types associated with a malicious address. The threat types may identify the malicious address as associated with, for example, a malware drive-by exploit site, an Internet site associated with malware, a malware command and control site, an aggressive Internet scanner, a site associated with email abuse or spam, a malicious advertisement site, or any other threat type. Also, the IP reputation data 224 may include other data associated with the malicious IP address, such as the associated Internet service provider, domain name, ASN (Autonomous System Number) numeric code, AS (Autonomous System) identity, estimated network speed, geographical data, or business sector. In some embodiments, the IP reputation data 224 may include corroboration data indicating whether other worldwide data sources have also identified the malicious IP address as associated with malware, ASN threat percentile data indicating the relative percentile of malicious IP addresses concentrated within the ASN, or an indication of whether the domain associated with the malicious IP has been created within the last thirty days. The IP reputation data 224 may be updated regularly (e.g., daily) or as new threats are identified.

The network activity correlation module 210 outputs the current network context 144 for evaluation by the network context evaluation module 212. The network context evaluation module 212 applies network role data 226 and/or network policies 228 to the current network context 144 to evaluate the current network context 144 based on the role data 226 and/or policies 228. To do this, the network context evaluation module 212 may determine the network policies 228 and/or role data 226 that match the current network context 144 (e.g., by running queries or similarity algorithms). The network context evaluation module 212 may select applicable network policies 228 based on criteria that match, e.g., the current network activity data 140, the IP reputation data 224, and/or the network role data 226. For instance, the network context evaluation module 212 may apply a matching threshold and/or duration to the applicable security policies 228. The matching threshold and duration may require that at least a certain number of network flows be matched within a given duration prior to triggering identification of a network event. As another example, the network context evaluation module 212 may require a threshold number of matching network flows originating from the same source address to trigger the identification of a network event. The network context evaluation module 212 may generate one or more network event indicators 146 based on its evaluation of the current network context 144.

The illustrative network role data 226 may define abstract network roles and associate the network roles with particular network addresses, subnets, or other address specifiers. The network role data 226 may be prepared by a network administrator to correspond to the topology or other design of the network 150. For example, the network role data 226 may group addresses into types of machines (e.g., workstation, server, peripheral device, etc.). As another example, the network role data 226 may segment the network 150 into functional tiers or zones (e.g., web tier, database tier, application tier, etc.). Example roles may include workstation, peripheral, application server, network device, ignored device, infrastructure asset, or any other network role that may be defined by a network administrator. Network roles may be defined hierarchically or otherwise tailored to particular network topologies. For example, network roles may be grouped into one or more super-roles or tiers (e.g., a web tier, application tier, and database tier). The network role data 216 may be configured by a network administrator, for example using one or more configuration files.

The network policies 228 may be defined by a network administrator and may specify the rules for handling various different types of network conditions and events. As noted above, in dynamically programmable networks, the policies 228 can be flexible to adapt to changing network conditions or even to conditions at a particular node 170 or switching device 160. The network policies 228 may be embodied as any appropriate data format, including, for example, as one or more extensible markup language (XML) files. In some embodiments, each policy 228 may specify a set of criteria to be matched against the current network context 144. A policy 228 may specify a response to be generated when matching traffic is encountered. The response may include any directive, command, handling decision, or other action to enforce the network security policy. For example, the response may be embodied as a directive to drop all flows matching the criteria, block a particular address, quarantine a particular address, redirect flows from a particular address, ignore all records matching the criteria, produce a warning for each record matching the criteria, log each record matching the criteria, execute an arbitrary shell command, or any other action.

The conflicts data 136 may be embodied as, for example, a log file generated by the conflict analyzer module 526 of FIG. 5, discussed below. The conflicts data 136 may include historical data relating to conflicts between candidate network executable actions 132 generated by the security initiative translator module 510 and existing network policies 228, as detected by the conflict analyzer module 526, as well as data indicating how those conflicts were resolved by the conflict analyzer module 526.

As a result of its evaluation of the current network context 144, the network context evaluation module 212 may identify one or more network events in accordance with the role data 226, conflicts data 136, and/or policies 228. For example, the current network context 144 may include data indicative of a network threat, but the network policies 228 or role data 226 may be defined for the network 150 such that the network context evaluation module 212 concludes that the threat does not currently require any action to be taken to respond to the threat. In this case, the network context evaluation module 212 may not output a network event indicator 146 corresponding to the identified network event, or may output a graphical element indicative of the network event but which indicates that the event is currently of lower priority. As the current network context 144 evolves over time, the network context evaluation module 212 may reassess the identified network event according to the new context 144 and may increase the priority of the network event and then output a corresponding network event indicator 146 at that time.

The network context evaluation module 212 outputs network event indicators 146 for visualization by the interactive network visualization subsystem 112. As used herein, a "network event indicator" may refer to data indicative of a network event that is to be included in the visualization 114. Such data may include, for example, node and/or flow identifying information (e.g., IP addresses) identifying nodes and/or flows affected or predicted to be affected by a threat or infection, threat or infection indicators (e.g., the type of threat or infection), threat or infection severity or priority indicators, and/or other data that may be needed by the interactive network visualization subsystem 112 to prepare or update the network visualization 114.

Figure 3:
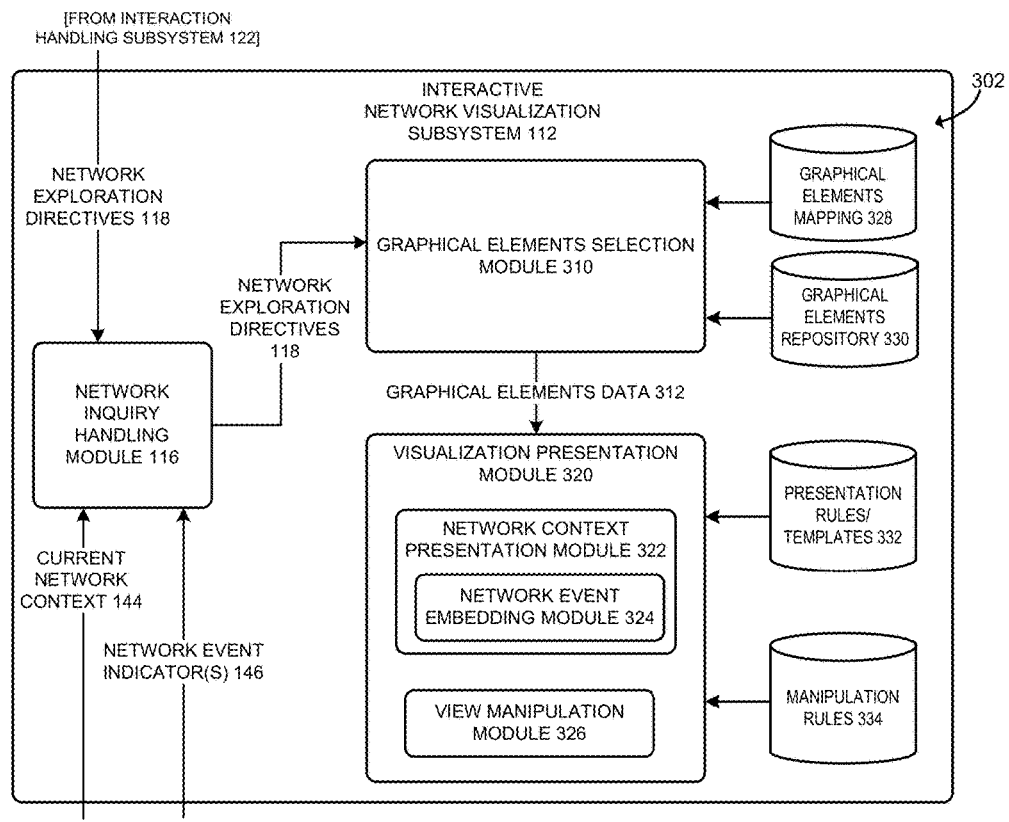
FIG. 3 is a simplified schematic diagram of at least one embodiment of an environment that may be established by an interactive network visualization subsystem of the network security management system of FIG. 1.

Referring now to FIG. 3, an embodiment of the interactive network visualization subsystem 112 is shown in more detail. The illustrative interactive network visualization subsystem 112 establishes an environment 302 during operation (e.g., a native or virtual execution or "runtime" environment). The environment 302 includes the network inquiry handling module 116, a graphical elements selection module 310, a visualization presentation module 320, a network context presentation module 322, a network event embedding module 324, and a view manipulation module 326. The components and modules shown in FIG. 3 may each be embodied as hardware, firmware, software, or a combination thereof (e.g., software code written in a programming language such as Java and/or Python).

The network inquiry handling module 116 analyzes network exploration directives 118, which are passed to or otherwise made available to the network inquiry handling module 116 by the interaction handling subsystem 122. For example, the network inquiry handling module 116 parses the network exploration directives 118 and determines whether the directives 118 include a request for information that should be translated to a network inquiry 138 to be submitted to the source(s) of network information 190 (e.g., the network analytics subsystem 142 and/or the network model 192), or whether the directives 118 include a view manipulation command. If the network exploration directives 118 are to be translated to a network inquiry 138, the network inquiry handling module 116 formulates the requisite query, sends the query to the pertinent component(s) of the source(s) of network information 190 (e.g., the network analytics subsystem 142 and/or the network model 192), receives the query results from the pertinent source(s) of network information 190 (e.g., the network analytics subsystem 142 and/or the network model 192), and incorporates the query results in the network exploration directive 118 for inclusion in the visualization 114. The query results may include a user-requested subset of the current network context data 144 and/or network event indicators 146. If the network exploration directives 118 include a view manipulation command that does not require a network inquiry 138, the network inquiry handling module 116 simply forward the network exploration directives 118 to the graphical elements selection module 310.

The graphical elements selection module 310 analyzes the data retrieved from or supplied by the source(s) of network information 190 (e.g., the current network context 144, the network event indicators 146, and/or the impact assessment data 148), and determines the manner in which the current network context 144 and the network event indicators 146 should be represented graphically in the visualization 114, in view of the then-current network exploration directives 118. To do this, the illustrative graphical elements selection module 310 accesses graphical elements mapping data 328. The graphical elements mapping data 328 includes data that associates various different characteristics of the current network context 144 and the network event indicators 146 with graphical elements that may be presented in the visualization 114. For example, if the current context 144 indicates that a client node 170 is currently running a particular operating system platform, the graphical elements mapping 328 may associate the current context 144 with a graphical element that is representative of the operating system platform (e.g., an icon or logo). If the current context 144 indicates that a node 170 is a server node, the graphical elements mapping 328 may associate the current context 144 with a graphical element that visually depicts a server computer (e.g., as distinguished from a client computer or network device). If the network event indicators 146 indicate that a network flow has a destination node that has been compromised by a network infection, the graphical elements mapping 328 may associate the network event indicators 146 with a graphical element that highlights the network flow and/or the compromised destination flow. Many other associations between characteristics of the data retrieved from or supplied by the source(s) of network information 190 (e.g., the current network context 144 and/or network event indicators 146 and/or impact assessment data 148) are possible, including associating nodes 170 or switches 160 with graphical elements that visually depict the geographic regions in which such nodes 170 or switches 160 are located, and graphical elements that visually depict different types of network threats, infections, risks, or problem areas. The graphical elements mapping 328 may be embodied as, for example, a searchable database, knowledge base, data file, or mapping table implemented using any suitable form of data structure. The graphical elements mapping 328 may be updated from time to time, e.g., as new characteristics of the current network context 144 and/or the network event indicators 146 and/or the impact assessment data 148 are discovered by the system 110.

Once the graphical elements selection module 310 has determined, e.g., using the graphical elements mapping 328, which graphical elements to use to depict the current network context 144 and network event indicators 146 in the visualization 114, the graphical elements selection module 310 selects the appropriate graphical elements from, e.g., a graphical elements repository 330. The graphical elements repository 330 may be implemented locally or remotely, for example, distributed across a network. The graphical elements repository 330 may store the graphical elements that may be used in the visualization 114 or contain an index that allows the system 110 to access the appropriate graphical elements when needed. Illustrative examples of graphical elements include computer-generated lines, shapes, icons, logos, images, video clips, multimedia objects, color and texture.

The graphical elements selection module 310 outputs or otherwise allows access to graphical elements data 312 by the visualization presentation module 320. The graphical elements data 312 includes the graphical elements to be depicted in the visualization 114, as selected by the graphical elements selection module 310, or data that allows the visualization presentation module 320 to access the selected graphical elements. The illustrative visualization presentation module 320 generates the visualization 114 based on the graphical elements data 312 and other data as needed, such as any then-current network exploration directives 118 and/or aspects of the network model 192. To prepare the visualization 114, the network context presentation module 322 arranges the graphical elements indicated by the graphical elements data 312 according to presentation rules/templates 332. The presentation rules/templates 332 may be pre-defined and interactively modifiable computer-readable rules and/or templates that stipulate aspects of the arrangement of graphical elements in the visualization 114 (e.g., rules/templates corresponding to various network exploration directives 118). For example, the presentation rules/templates 332 may indicate that all nodes 170 of a certain type be grouped together, or that network flows should be displayed with animation indicating the direction of the network flow. Using the presentation rules/templates 332, the network context presentation module 322 generates the visualization of the current network context 144.

The network event embedding module 324 embeds the graphical elements depicting the network event indicators 146 in the visualization 114 according to the presentation rules/templates 332 in a similar manner. For example, if a network event indicator 146 indicates that a node 170 has been affected by a network threat, the presentation rules/templates 332 may indicate that a graphical element depicting the particular type of network threat is to be overlaid on the graphical depiction of the node 170 in the visualization 114. The presentation rules/templates 332 may also specify other aspects of the visualization 114, such as foreground and background elements, presentation style (e.g., hierarchical tree structure, Sankey diagram, game-like interface, 2D or 3D, etc.). The presentation rules/templates 332 may store in memory using any suitable data structure, e.g., a searchable database or XML data structure.

The illustrative view manipulation module 326 performs a real time, interactive update of the view of the visualization 114 that is presented to the user in response to the network exploration directives 118. The view manipulation module 326 matches network exploration directives 118 to manipulation rules 334 and then implements the network exploration directives 118 in accordance with the matching rules. For example, a network exploration directive 118 may include a command to rotate the view of the visualization by 90 degrees. The corresponding manipulation rule 334 may specify the device-level actions that need to be executed to cause the visualization 114 to rotate by 90 degrees. In some cases, the network exploration directive 118 may be ambiguous, i.e. the system 110 may have a lower degree of confidence that it interpreted the user interaction 120 correctly. In such an event, the manipulation rules 334 may indicate that the system 110 should prompt the user for clarification, e.g., by using a question-and-answer dialog format.

The interactive network visualization subsystem 112 provides or otherwise makes available network visualization data 128 to the interaction handling subsystem 122 for use in the interpretation of user interactions 120. The network visualization data 128 includes descriptive information (e.g., arguments, parameters, etc.) relating to the current view of the visualization 114. Thus, the network visualization data 128 is updated as the view and contents of the visualization 114 are updated (e.g., in response to changing network context and/or implementation of network exploration directives 118).

Figure 4A:
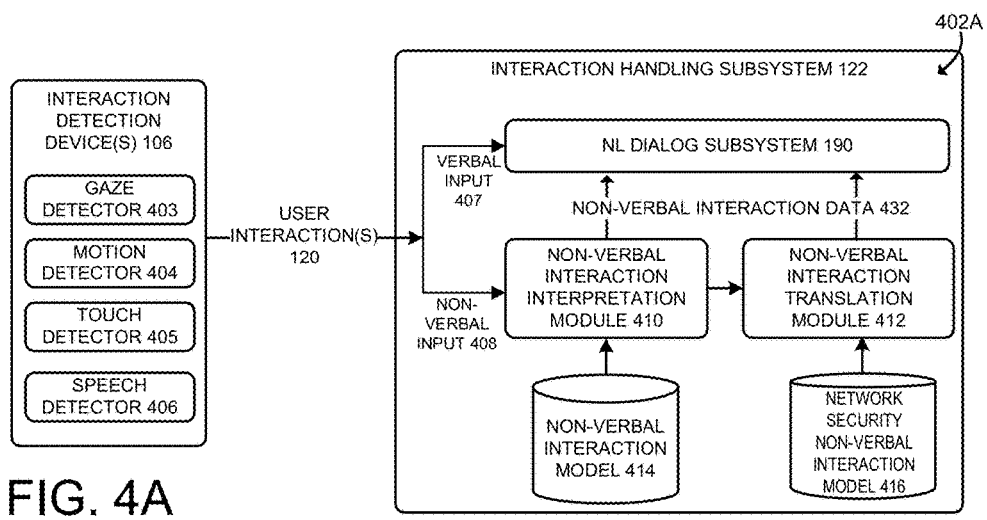
FIG. 4A is a simplified schematic diagram of at least one embodiment of an environment that may be established by an interaction handling subsystem of the network security management system of FIG. 1.

Referring now to FIG. 4A, an embodiment of the interaction handling subsystem 122 is shown in more detail. The illustrative interaction handling subsystem 122 establishes an environment 402 during operation (e.g., a native or virtual execution or "runtime" environment). The environment 402 includes the NL dialog subsystem 190, a non-verbal interaction interpretation module 410, a non-verbal interaction translation module 412, a non-verbal interaction model 414, and a network security interaction model 416. These and/or other machine-executable components of the interaction handling subsystem 122 process the user interactions 120 and provide machine-readable representations of such inputs to the interaction handling subsystem 122, including the NL dialog subsystem 190. For example, components of the interaction handling subsystem 122 may convert analog signals to digital form, translate mouse clicks or gestures to a text command or data, or resolve data and/or instructions received from other computer applications according to conversion specifications using, for example existing or readily available techniques. The interaction handling subsystem 122 analyzes the user interactions 120 and formulates from the user interactions 120 network exploration directives 118 or network security initiatives 124 (or determines that the user interactions 120 should be disregarded as neither network exploration directives 118 nor network security initiatives 124). In formulating the network exploration directives 118 and/or network security initiatives 124, the interaction handling subsystem 122 may access information provided by the network model 192.

As shown in FIG. 4A, illustrative interaction detection devices 106 used to capture user interactions 120 include a gaze detector 403 (e.g., a still-image or video camera), a motion detector 404 (e.g. a kinetic sensor, proximity sensor, accelerometer, gyroscope, or any combination thereof), a touch detector 405 (e.g., a touch sensor of a touchscreen display device), and/or a speech detector 406 (e.g., one or more microphones). The interaction detection devices 106 may be embodied in any component of the network security management system 110, including personal mobile computing devices of the user, enterprise network management devices, standoff sensing devices (such as wall or ceiling mounted cameras and sensors), and/or others. The components and modules shown in FIG. 4A may each be embodied as hardware, firmware, software, or a combination thereof (e.g., software written using a programming language such as Java, C++, and/or Python). Some illustrative technologies for implementing portions of the interaction handling subsystem 122 are described in the aforementioned U.S. Patent Application Publication No. 2012/0313854 ("Adaptable Input/Output Device") and U.S. Patent Application Publication No. 2013/0311508 ("Method, Apparatus, and System for Facilitating Cross-Application Searching and Retrieval of Content Using a Contextual User Model").

Figure 4B:
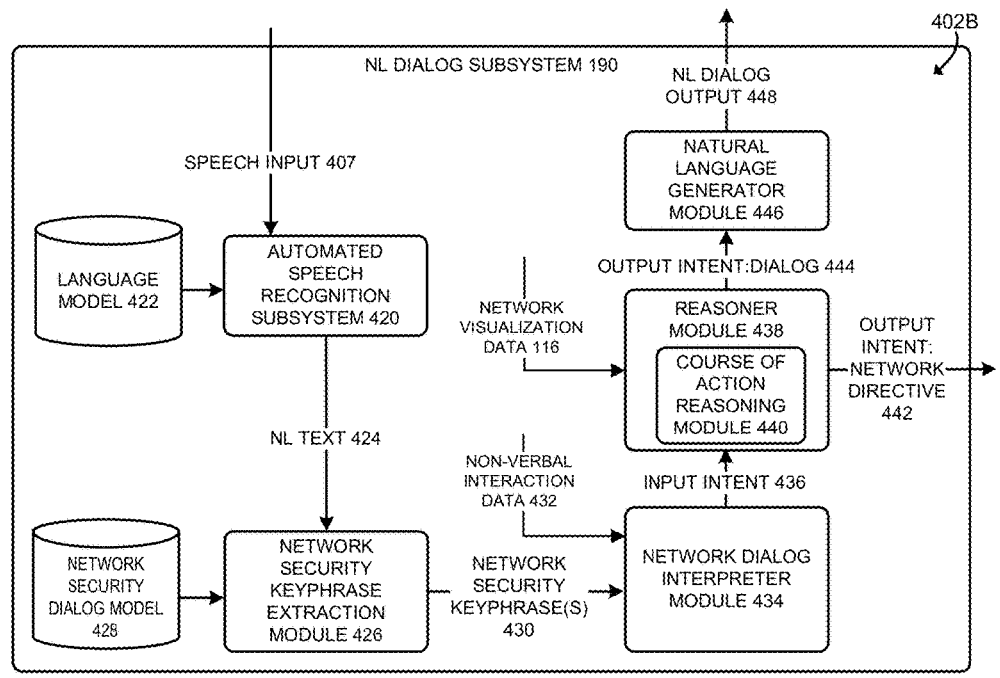
FIG. 4B is a simplified schematic diagram of at least one embodiment of an environment that may be established by a natural language dialog subsystem of the network security management system of FIG. 1.

The user interactions 120 can include verbal input 407 (e.g., natural language dialog, such as conversational speech or text messages) and/or non-verbal input 408 (e.g., gesture-based interactions, facial expressions, non-speech audio, etc.). The NL dialog subsystem 190 processes and interprets the verbal input 407. An embodiment of the NL dialog subsystem 190 is shown in FIG. 4B and described below. The non-verbal input 408 is processed by the non-verbal interaction interpretation module 410 and the non-verbal interaction translation module 412. The illustrative non-verbal interaction interpretation module 410 accesses a non-verbal interaction model 414 and utilizes the non-verbal interaction model 414 to interpret the user interactions 120, e.g., "what is this interaction?" (a gaze, a type of gesture, etc.), in the context of the current view of the visualization 114 as reflected in the network visualization data 128 provided by the interactive network visualization subsystem 112. The non-verbal interaction model 414 may be implemented as rules, templates, or classifiers (e.g., probabilistic or statistical classifiers) that associate interaction data or patterns of interaction data with various types of user interactions. For example, using the non-verbal interaction model 414, the non-verbal interaction interpretation module 410 may conclude that a set of motion data output by the motion detector 404 corresponds to a "swipe" gestures and that a different set of motion data corresponds to a "circle" or "point" gesture. Similarly, using the non-verbal interaction model 414, the interaction non-verbal interpretation module 410 may determine that a set of gaze data corresponds to a sustained focus at a specific part of the visualization 114.

Further, with the non-verbal interaction model 414, the non-verbal interaction interpretation module 410 may analyze combinations of different types of user interactions 120, in order to interpret a user interaction. That is, in some embodiments, a "user interaction" may encompass a combination or temporal sequence of different types of sensor outputs. For example, the non-verbal interaction interpretation module 410 may determine, using the non-verbal interaction model 414, that a user interaction 120 constitutes a gesture of pointing at a specific part of the visualization 114 and speech containing words including "quarantine that node." The rules, templates, and/or classifiers of the non-verbal interaction model 414 may be predefined, developed based on experimentation/observation, or learned by applying e.g., machine learning techniques to training data, such as user interaction data for a large population of users or a subset of a larger user population. Portions of the non-verbal interaction model 414 may be defined or personalized for specific types of users and/or for specific uses of the system 110. For instance, if the system 110 is to be implemented on smaller form factor devices, which may have a built-in camera that has a smaller field of view than that which may be integrated in a larger computing device, the non-verbal interaction model 414 may consider these and/or other factors in establishing interpretations of the user interactions 120.

The illustrative non-verbal interaction translation module 412 accesses and utilizes a network security interaction model 416 to interpret the interactions 120 in the context of the network security management system 110, e.g., what does this interaction mean in the context of this network visualization 114? The network context may include one or more of a historical context, e.g., based on log records, history of data flows and/or connections over a period of time, a current context, e.g., data indicative of current network activity, e.g., current data flows and/or connections; or a future context, e.g., a predictive model of anticipated network activity (which predicted context may be based on the historical and/or current context). The network security interaction model 416 may be implemented as a domain-specific interaction model 416 that is tailored for dialog relating to network security. For example, the network security interaction model 416 may include rules, templates, or classifiers (e.g., probabilistic or statistical classifiers) that associate interaction data or patterns of interaction data with various types of actions that may be taken by the system 110 (e.g., network exploration directives 118 or network security initiatives 124). For instance, the non-verbal interaction translation module 412 may, with the network security non-verbal interaction model 416, interpret a gesture that includes pointing at a network flow graphically depicted in the visualization 114 as a network exploration directive 118, or more specifically, as a request for the visualization 114 to "zoom in" or display more information about the pointed-to flow. As another example, the non-verbal interaction translation module 412 may, with the network security non-verbal interaction model 416, interpret a "point-and-wave away" gesture as a network security initiative 124 or more specifically as a request for the system 110 to redirect the network flow. Similarly, the non-verbal interaction translation module 412 may, with the network security non-verbal interaction model 416, interpret a "point-and-thumbs-down" gesture as a network security initiative 124, e.g., as a request for the system 110 to quarantine the pointed-to node. The interpretations of the non-verbal input 408 produced by the non-verbal interaction interpretation module 410 and the non-verbal interaction translation module 412 are output or otherwise made available to the NL dialog subsystem 190, in some embodiments.

The rules, templates, and/or classifiers of the network security non-verbal interaction model 416 may be predefined (e.g., hand crafted), developed based on experimentation/observation, or learned by applying e.g., supervised machine learning techniques to training data, such as user interaction data collected for a large population of users or a subset of a larger user population. Portions of the network security non-verbal interaction model 416 may be defined or personalized for specific types of users and/or for specific uses of the system 110. For instance, different network administrators may have different preferences as to the gestures that they would like to use to initiate different actions on the network 150, and the network security non-verbal interaction model 416 can be adapted to include those preferences.

As discussed above, the interaction handling subsystem 122 can receive (e.g., via one or more of the components 104, 106) and utilize a number of different forms of input, including human natural language dialog inputs (e.g., spoken or textual words and phrases), non-dialog human-generated inputs (e.g., non-dialog keyboard, keypad, or touch screen inputs, mouse clicks, gestures, and/or others), computer application inputs (e.g., data and/or instructions passed by another computer application to the system 110, through an application programming interface, for example), and sensor inputs (e.g., electrical signals embodying sensed information such as geographic location, motion, temperature, activity, biometric data, etc.).

In some embodiments, the interaction handling subsystem 122 may perform authentication processes to verify a user's identity. For example, the user's identity may be verified using voice biometrics as disclosed in, for example, Scheffer et al., U.S. patent application Ser. No. 13/358,900, filed Jul. 27, 2012 and entitled "Multi-Sample Conversational Voice Verification;" and Scheffer, U.S. patent application Ser. No. 13/333,020, filed Dec. 21, 2011 and entitled "Method and Apparatus for Generating Speaker-Specific Spoken Passwords," both of which are incorporate herein by this reference in their entirety.

In some embodiments, the interaction handling subsystem 122 captures the user's spoken natural language dialog input with a microphone or other audio input device of the computing system 100. Alternatively or in addition, the interaction handling subsystem 122 captures text-based natural language dialog input by, for example, a touch pad, key pad, or touch screen of the computing system 100 (e.g., via a text messaging application or real-time "chat" application). Other (e.g., non-NL dialog) user inputs also may be captured by, e.g., a touch pad, keypad, touch screen, or other input device, through the user interface 120. Such non-NL dialog inputs may include, for example, mouse clicks, taps, swipes, pinches, and/or others. In some cases, the interface 120 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 100 as discussed above. In any event, the captured user inputs are at least temporarily stored in memory of the computing system 100.

Referring now to FIG. 4B, an embodiment of the NL dialog subsystem 190 is shown in more detail. The illustrative NL dialog subsystem 190 utilizes an NL dialog processing platform, such as a generic virtual assistant platform as described in, e.g. U.S. Patent Application Publication No. 2013/0152092. The NL dialog subsystem 190 is augmented with or interfaces with network security domain-specialized modules that allow the network security management system 110 to conduct a conversational natural language dialog with a user (e.g., a network administrator) regarding computer network security, and for translating high-level "course of action" user requests into network directive output intents 442 (e.g., network policy specifications, commands, visualization requests, queries, monitoring requests, and/or other appropriate directives. Using technologies disclosed herein and/or other commercially available natural language processing technology, the NL dialog subsystem 190 enables the user to carry on a natural language conversation with the computer network security system in order to gather relevant information (e.g., current network context 144), explore network visualization and/or remediation options, and request remedial action. Remedial network security actions may include, for instance, diversion of a particular network flow, or quarantine of a node.

The NL dialog subsystem 190 and/or components of the network security subsystem 130, described below, translates these high-level user requests into digital directives that specify the user-requested network reconfigurations in a form that is actionable by one or more components of the network 150. In some embodiments, the NL dialog subsystem 190 translates these user requests (e.g., network security initiatives 124) into an intermediate, relatively platform independent format using, for example, technology described in U.S. Patent Application Publication 2014/0331280. In some embodiments, the network security initiatives or intermediate-level directives are converted to actionable, network-executable instructions (e.g., packet disposition directives) executable by a network infrastructure, such as the SDN switching infrastructure. In some embodiments, SDN security mediation technology is also employed to provide a highly secure SDN mechanism for dynamically reconfiguring the data plane and the behavior of network switching devices. Examples of these and other security directive translation and security mediation technologies are described in U.S. Patent Application Publication 2014/0331280 and U.S. Patent Application Publication No. 2014/0075519.

The NL dialog subsystem 190 establishes an environment 402B during operation (e.g., a native or virtual execution or "runtime" environment). The environment 402B includes an automated speech recognition subsystem 420, a language model 422, a network security keyphrase extraction module 426, a network security dialog model 428, a network dialog interpreter module 434, a reasoner module 438 (including a course of action reasoning module 440), and a natural language generator module 446. The components and modules shown in FIG. 4B may each be embodied as hardware, firmware, software, or a combination thereof (e.g., software written using a programming language such as Java and/or Python, and/or XML data structures).

The NL dialog subsystem 190 processes the NL dialog inputs, but any or all of the other forms of user interactions 120 may be analyzed by the NL dialog subsystem 190 to aid in its understanding of the NL dialog inputs, to determine the intent of the NL dialog inputs given the current context of the network visualization 114, to determine a suitable response to the NL dialog inputs, or for other reasons. As used herein, "natural language" may refer to words, phrases, verbal expressions, and/or combinations thereof, which are formulated by a human, device, or system in a fashion that is or is intended to approximate or simulate speech that normally arises in an unpremeditated fashion as the result of the innate facility for language possessed by the human intellect (as distinguished from, for example, structured computer programming languages or code). As used herein, terms such as "dialog" and "conversational" may refer to the use of natural language (e.g., spoken or written) in the context of a communicative exchange of information, ideas, opinions, sentiments, observations, questions and answers, statements and responses, or the like, involving a user and a computing device. As used herein, an "intent" may refer to a structured representation of a system-generated interpretation of the speech input 407. For example, an intent may include semantic information indicative of the user-intended meaning of the speech input 407. Stated another way, an intent may represent a likely intended goal or objective of the user that is deduced by the NL dialog subsystem 190 from the NL input 407.

Terms such as "goal" and "objective" are used herein may convey that in some embodiments, the NL dialog subsystem 190 attempts to determine not only the words of the speech input 407, but the semantic meaning, e.g., user's actual intended goal or objective, which he or she used those words to express. To do this, the NL dialog subsystem 190 may consider the non-verbal interaction data 432 and/or aspects of the network visualization data 128 (which may include aspects of the current network context 144, the network event indicators 146, and/or the impact assessment data 148). As an example, the user might say something like "kill that node"—which in this context means that the user's goal is disconnect a particular external node from the network 150, where the identifying information for "that node" may be derived from non-verbal interaction data 432 (e.g., as a result of the user pointing at a graphical depiction of "that node" on the visualization 114). Determining the intended goal or objective of a user's natural language dialog can involve the application of artificial-intelligence based automated reasoning methods and systems. In some embodiments, intents may be predefined as, e.g., XML data structures which are then instantiated in response to the receipt of NL speech 407. That is, the NL dialog subsystem 190 may ascribe values to one or more arguments of a predefined intent based on a particular instance of the NL speech 407.

In the case of spoken natural language inputs, the automated speech recognition (ASR) subsystem 420 processes the natural language speech input 407 using a language model 422, and generates a machine-readable version of the user's speech that can be further analyzed and processed by the network security keyphrase extraction module 426 and other modules of the NL dialog subsystem 190. Typically, an ASR system identifies spoken words and/or phrases in the spoken natural language dialog inputs and recognizes and converts them into text form (e.g., words, word strings, phrases, "segments," "sentences," or other forms of verbal expression). To do this, the ASR subsystem 420 accesses and utilizes the language model 422 to map various acoustic features of the speech signal (i.e., the NL speech input 407) with the corresponding words most likely matching the acoustic features. There are many ASR systems commercially available; one example is the DYNASPEAK system, available from SRI International. While the ASR subsystem 420 is shown in FIG. 4B as a component of the NL dialog subsystem 190, in other embodiments, the ASR subsystem 420 may be an external (e.g. third party) component with which the network security management system 110 communicates. The ASR subsystem 420 outputs or otherwise makes available to the network security keyphrase extraction module 426, NL text 424 determined by the ASR subsystem 420 to correspond to the speech input 407.

In some embodiments, the non-verbal interaction data 432 output by the non-verbal interaction interpretation module 410 and/or the non-verbal interaction translation module 412 may be used by the NL dialog subsystem 190 to supply contextual information for the interpretation of the speech input 407. Some examples of applications including multimodal user interfaces and/or "context aware" systems in which non-verbal interaction data may be used to interpret speech inputs are described in other patent applications of SRI International, for example, Tur et al., PCT International Application Publication No. WO 2011/028833, entitled "Method and Apparatus for Tailoring Output of an Intelligent Automated Assistant to a User" and Yadgar et al., U.S. Patent Application Publication No. 2013/0152092, entitled "Generic Virtual Personal Assistant."

The illustrative network security keyphrase extraction module 426 accesses and utilizes a network security dialog model 428 to identify and extract words or phrases from the NL text 424 that are indicative of, e.g., a network exploration directive 118 or network security initiative 124 (e.g., a query, command, or monitoring request). The illustrative network security dialog model 428 may be embodied as, for example, an ontology that defines relationships or associations between words or phrases and their meaning in the context of network security, or as a set of rules, templates, or grammars, etc. For example, the network security dialog model 428 may be used by the network security keyphrase extraction module 426 to determine that natural language phrases found in the NL text 424 such as "tell me," "my printers or copies," "connects to," "IP addresses outside the U.S.," or "stop the connection" likely correspond to, e.g., commands, actions, arguments, or parameters of a network exploration directive 118 or network security initiative 124 and thus should be extracted from the NL text 424 for further analysis. The network security keyphrase extraction module 426 outputs or otherwise makes available to the network dialog interpreter module 434, the network security keyphrases 430, which the network security keyphrase extraction module 426 has extracted from the NL text 424.

The network dialog interpreter module 434 performs natural language interpretation techniques on the network security keyphrases 430. If non-verbal interaction data 432 is available, the network dialog interpreter module 434 may utilize the non-verbal interaction data 432 to interpret the network security keyphrases 430. For example, the network dialog interpreter module 434 may identify the network data flow corresponding to a user's pointing gesture, with reference to the visualization 114, as "the connection" in the NL dialog "stop the connection." The illustrative network dialog interpreter module 434 converts the relatively unstructured network security keyphrases (and non-verbal interaction data 432, if available) to structured data, e.g., input intents 436. To do this, the illustrative network dialog interpreter module 434 develops a network dialog parse tree based on the extracted keyphrases 430, and then translates the parse tree to a network security directive, such as a flow policy directive or packet disposition directive, using, e.g., technology disclosed in network security keyphrase extraction module.

In some embodiments, the network dialog interpreter module 434 interprets the words and/or phrases 430 produced by the ASR subsystem 420 and extracted by the keyphrase extraction module 426 based on other words or phrases extracted from the speech input 407 during the user's current dialog session with the system 110. For instance, network dialog interpreter module 434 may apply a rule-based parser and/or a statistical parser to provide a semantic interpretation of the keyphrases 430. An illustrative example of a natural language understanding component that may be used in connection with network dialog interpreter module 434 is the SRI Language Modeling Toolkit, available from SRI International. As noted above, in some embodiments, the network dialog interpreter module 434 combines the keyphrases 430 with the non-verbal interaction data 432 and communicates the combined information to the reasoner module 438 in the form of a combined input intent 436 or a sequence or combination of multiple input intents 436.

The network dialog interpreter module 434 passes or otherwise makes the input intents 436 available to the reasoner module 438. The illustrative reasoner module 438 analyzes the input intent 436 and, in some cases, portions of the current network visualization data 128, and determines what the system 110 should do in response to the input intent 436. For instance, the reasoner module 438 may execute computer logic such as task flows, as described in, for example, U.S. Patent Application Publication No. 2013/0152092. The reasoner module 438 generates one or more output intents, e.g., a dialog output intent 444 and/or a network directive output intent 442, which represents the system 110's response to the input intent 436 (e.g., a fulfillment of the user's likely intended goal or objective as expressed in the speech input 407, as interpreted by the NL dialog subsystem 190). If the output intent is a dialog output intent 444, the reasoner module 438 passes or otherwise makes available the output intent 444 to the system natural language generator module 446. Some illustrative examples of dialog output intents 444 include system-generated requests for further clarification of the speech input 407 (e.g., in cases in which the interpreter module 434 has a relatively low confidence level in the accuracy of its interpretation of the speech input, e.g., confidence level is less than a predefined threshold). Other examples of dialog output intents 444 include responses to user queries and other requests (including recommended courses of action, current network context information, network event information, and impact assessment information), and confirmations that the system 110 is going to execute a user-requested command (e.g., "are you sure you want me to disconnect that node from the network? OK, disconnecting the node from the network"). If the output intent is a network directive output intent 442, the reasoner module 438 passes or otherwise makes available the output intent 442 to the network security subsystem 130 (e.g., as a network security initiative 124) or to the interactive network visualization subsystem 112 (e.g., as a network exploration directive 118).

The illustrative reasoner module 438 includes a course of action (COA) reasoning module 440. The illustrative COA reasoning module 440 is configured to synthesize the input intent(s) 436 and/or any of the other available inputs (e.g., network visualization data 128, impact assessment data 148, current network context 144, and/or network event indicators 146) and determine, using automated reasoning (e.g., rule-based reasoning or classifiers) a likely appropriate task flow, "work flow" or other steps or processes to execute on the user's behalf, and/or a likely appropriate system response to the user's intended goal or objective as derived from the meaning of the speech input 407 and reflected in the input intent 436 (where "likely appropriate" may refer to a computed statistical measure of confidence determined and/or evaluated by the COA reasoner module 440). In some cases, the likely appropriate system task may be to perform a requested action on the computing system 100 (such as initiate a network-executable action 132 or execute a network inquiry 138), whereas in other cases, an appropriate system task or response may be to present information to the user in order to elicit from the user additional inputs that may help the NL dialog subsystem 190 more accurately develop the the input intent 436. The COA reasoner module 440 may execute one or more such task flows, "work flows," etc., to create the output intents 442, 444, and to determine the data values (if any) to pass to one or more other modules of the NL dialog subsystem 190 (e.g., the natural language generator module 446, the network security subsystem 130, or the interactive network visualization subsystem 112), along with the output intent(s) 442, 444. In some cases, the COA reasoning module 440 may pass the output intents 442, 444 back to interpreter module 434 for use in interpreting future instances of speech input 407.

In some embodiments, the COA reasoning module 440 may perform the functions of a dialog manager, which keeps track of the current state and flow of each conversation or dialog that occurs between the user and the system 110. In such an embodiment, the COA reasoning module 440 may apply dialog-managing rules, templates, or task flows, for example, to the user's NL dialog input 407, which are appropriate in view of the current context. For example, the COA reasoning module 440 may apply rules for determining when a conversation with the user has started or ended, or for determining whether a current non-verbal input is related to a speech input.

In some embodiments, the COA reasoning module 440 may determine that more than a single action should be performed in response to the input intent 436. For example, an input intent 436, "block my printer from connecting to an IP address outside the United States" may correspond to multiple network directive output intents 442: "monitor for connections from my printer to IP addresses outside the U.S." and "block my printer."

If the COA reasoning module 440 has determined an appropriate course of action by which to respond to the NL speech input 407 that includes a dialog output intent 444, the COA reasoning module 440 communicates the dialog output intent 444 to the natural language generator module 446. The dialog output intent 444 may specify the content of system output that the reasoner module 438 believes (e.g., has a high degree of statistical confidence) is likely appropriate in response to the input intent 436. For example, if the input intent 436 is "notify me when a new web server appears on the network," the COA reasoning module 440 may determine by executing various task flows, analyzing the intent history, and/or conducting other automated (e.g., artificial intelligence-based) reasoning activities, that an appropriate dialog output intent 442 is system-generated NL dialog output in the form of a notification that "a new web server has connected to the network." In some embodiments, the input intents 436 and the output intents 442, 444 may be embodied as parameter list structures, with each parameter having predefined attributes. As used herein, "pass" or "make available" or similar terminology may be used to refer to, for example, computer programming techniques in which one or more data values are included as arguments to called functions or procedures. Any suitable method of data communication may be used, including inter-process communications and/or others.

The natural language generator (NLG) module 446 generates a natural language version of the dialog output intent 444, the NL dialog output 448, which is output via, e.g., one or more speakers, displays, or other user interface and/or user interaction detection devices 104, 106. To do this, the NLG module 446 may map the output intent 444 to one or more predefined NL response rules or templates. In some embodiments, the NL responses may be embodied as templates for system-generated natural language output, including parameters representing fields in which specific data values may be inserted. For example, an NL response may include the phrase "Which <node> do you want to disconnect"), where <node> indicates a parameter that may be replaced with a data value obtained or derived from the speech input 407 or a subsequent round of NL dialog with the user. A speech synthesizer or text-to-speech (TTS) module may be used to convert natural-language text generated by the natural-language generator module 446 to speech (e.g., machine-produced speech using a human or humanlike voice), and played through a speaker of the computing system 100. Alternatively or additionally to the NL dialog output 448, a network directive output intent 442 may be formulated as a network exploration directive 118, which may be processed by the interactive network visualization subsystem 112 to update or change the view or contents of the current network visualization 114.

Figure 5:
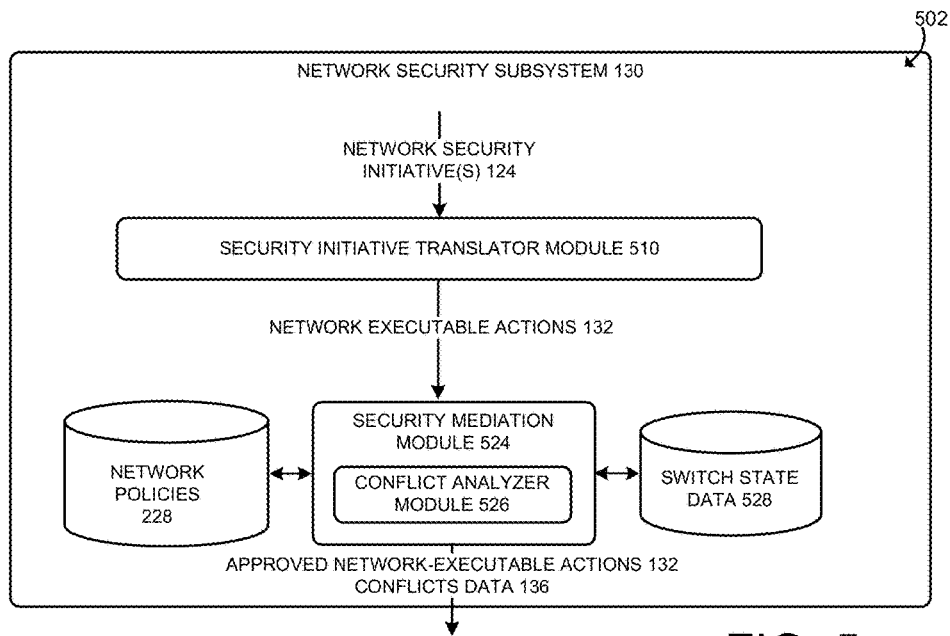
FIG. 5 is a simplified schematic diagram of at least one embodiment of an environment that may be established by a network security subsystem of the network security management system of FIG. 1.

Referring now to FIG. 5, an embodiment of the network security subsystem 130 is shown in more detail. The illustrative network security subsystem 130 establishes an environment 502 during operation (e.g., a native or virtual execution or "runtime" environment). The environment 502 includes a security initiative translator module 510, a security mediation service 524, a conflict analyzer module 526, network policies 228, and network switch data 528. The components and modules shown in FIG. 5 may each be embodied as hardware, firmware, software, or a combination thereof (e.g., software written using a programming language such as Java, C++ and/or Python).

Portions of the network security subsystem 130 may embodied in or as a network flow controller of the network 150. In other embodiments, portions of the network security subsystem 130 may be considered part of a "control plane" of the network 150 but not necessarily part of a network controller. For instance, the security initiative translator module 510 may be embodied as a network application that communicates with a network controller via, e.g., an application programming interface (API). As an example, using the OPENFLOW framework, the security initiative translator module 510 may communicate with a network controller via a northbound API, where, for example, the security initiative translator module 510 contains a client-side northbound API and the network controller contains a server-side northbound API.

The security initiative translator module 510 or the security mediation module 524 may communicate directly with one or more of the network switches 160 via, e.g., a southbound API of an OPENFLOW network. Alternatively, the security initiative translator module 510 or the security mediation module 524 may communicate with the network switches 160 indirectly via a network controller, or the security initiative translator module 510 may communicate with the network switches 160 indirectly via the security mediation module 524. In some embodiments, the security initiative translator module 510 may be included as a component of the security mediation module 524 (e.g., operate in the same process space as other components of the network security subsystem 130).

The execution of the network security subsystem 130 is also usually separated from any processes that may be running at the switches 160 (e.g., the "data plane"). For example, in some embodiments, at least some components of the network security subsystem 130 are not implemented as part of a firewall. The network security subsystem 130 may be embodied as a software abstraction of the network control layer (e.g., "control plane") of the network switches 160. For instance, portions of the network security subsystem 130 may be implemented as part of or as an extension to an SDN controller, such as an OpenFlow controller. In other embodiments, portions of the network security subsystem 130 may be embodied in a shim layer between a network controller and network applications, or as part of another type of network virtualization layer. In any case, the network security subsystem 130 may execute on one or more computing devices (e.g., servers), separately from the network switches 160 and/or separately from other computing devices on which any network applications may be running. The network security subsystem 130 may be connected to each of the switches 160 using, e.g., a dedicated control connection.

The illustrative security initiative translator module 510 analyzes the network security initiatives 124 produced by the interaction handling subsystem 122 and generates one or more network-executable actions 132 configured to implement the network security initiatives 124 on the network 150 and/or security policy updates 134. For example, whereas a network security initiative 124 may comprise a high level directive corresponding to a gesture to "quarantine that node," the network-executable actions 132 produced by the security initiative translator module 510 can include device-executable instructions that can be implemented by, e.g., one or more switching devices 160, to implement the network security initiative 124. For instance, quarantining a node may translate to a set of switch instructions to drop all communications from the quarantined node or redirect communications from the quarantined node to a honeynet. Some examples of technology that may be used to implement the security initiative translation module 510 are described in the aforementioned U.S. Patent Application Publication No. 2014/0317684 ("Security Actuator for a Dynamically Programmable Network"); and U.S. Patent Application Publication No. 2014/0331280 ("Network Privilege Manager for a Dynamically Programmable Computer Network").

The network security initiatives 124 may be transported to the network security subsystem 130 using any suitable format, transport, or protocol usable by the network security subsystem 130. In some embodiments, the security initiative translator module 510 converts the network security initiatives 124 directly into a number of network-executable actions 132 (e.g., packet disposition directives) that control the flow of traffic over the network 150. As discussed above, the network security initiatives 124 may include high-level threat-mitigation or security remediation directives that are then translated into lower-level network-executable instructions 132 (which may be referred to as "packet disposition directives" or "flow rules" in some embodiments). As used herein, "higher-level" and "lower-level" may refer to, among other things, relative degrees of abstraction, where higher-level may refer to network security directives that are more like human-intelligible text (and may not be directly executable by network switches or other network devices) and lower-level may refer to network security directives that are more like machine-intelligible codes and less like human-intelligible text (and may be directly executable by network switches or other network devices).

Some embodiments of the security initiative translator module 510 may resolve the higher-level network security directives using a pre-defined set of templates, rules, or policies, which may include, for example, "block," "deny," "allow," "redirect," "quarantine," "undo," "constrain," and/or "info" directives. A "block" directive may, for example, cause the system 110 to implement a full duplex filter between a Classless Inter-Domain Routing (CIDR) block and the internal network, where the primary use for this command is in blacklist enforcement. The deny, allow, undo, and info directives may be similar to their firewall counterparts and can be capable of being refined down to an individual flow rule. A "redirect" directive may, for example, enable a network application to tunnel all flows between a source and given target to a new target.

In response to a network-executable action 132, a switch 160 may, for example, proceed to rewrite the packet headers of all applicable network flows such that a source cannot tell that its flows have been redirected to the new target. One application of the "redirect" directive includes the redirection of a malicious scanner into a honeynet. A "quarantine" directive may enable a network application to essentially isolate an internal host from the network. A "constrain" directive may enable a network application to deactivate all current flow rules in the switches 160 that are not set to a specified priority (e.g., flow rules that are non-privileged).

The illustrative security mediation module 524 receives network-executable actions 132 (e.g., packet disposition directives) from the security initiative translator module 510. In some embodiments, the security mediation module 524 is non-bypassable, while in other embodiments, portions of the security mediation module 524 may be bypassable. In non-bypassable implementations of the security mediation module 524, the security mediation module 524 is implemented between the security initiative translator module 510 and the network switches 160, so that all network-executable actions pass through or are intercepted by the security mediation module 524 before being implemented by the switches 160. The security mediation module 524 evaluates the network-executable actions 132 based on the then-current network policies 228. After a network-executable action 132 has been evaluated by the security mediation module 524, the security mediation module 524 may communicate a corresponding security policy update 134 to the network policies 228 and/or may communicate the network-executable action 132 to one or more of the network switches 160.

As used herein, a "packet disposition directive" may refer to flow rules or any computer logic or instruction that determines or results in the disposition of one or more data packets by the switches 160 on the network 150, or which changes the switches' behavior or configuration in any way. Some examples of potential packet dispositions include "forward" (in which a data packet is sent on to its next, intermediate or final, destination), "drop" (in which a switch deliberately does not send a data packet on to its next destination, because, for example, the switch's capacity is overloaded or the switch believes that the packet is part of a denial-of-service attack), and "modify" (in which information in the packet header is modified by the directive). The packet disposition directives may conform to or extend a software-defined network protocol implemented by a network flow controller. For example, in some embodiments, the packet disposition directives may be OpenFlow messages. In some embodiments, the packet disposition directives may directly correspond to flow rules that can be directly instantiated at the network switches 160.

As used herein, a "flow rule" may refer to packet disposition directives that contain logic or instructions that, if executed at the network switches 160, do control the flow of data packets across the network 150. Thus, the set of all flow rules instantiated on the network 150 can embody a current implementation of the network security policy. However, in dynamically programmable implementations of the network 100, 150 rules, and thus, the network security policy, can be modified "on the fly" by the packet disposition directives. Thus, as used herein, "dynamically" connotes a network in which the flow rules, and thus the security policy, may be constantly varying or changing in response to, for example, the then-current network conditions. As used herein, terms such as "currently active flow rules" or "currently active directives" refer generally to the set of network-executable actions 132 (e.g., flow rules and/or other packet disposition directives) that, at a particular moment in time during the operation of the network 150, represents the then-current network security policies 228. As used herein, terms such as "candidate flow rule" or "candidate directive" may refer to, among other things, any flow rule or other packet disposition directive that is not currently part of the set of currently active directives. In other words, "candidate flow rules" may refer to flow rules that have not yet been evaluated by the security mediation module 524, are currently being evaluated by the security module 524, or that have been evaluated but rejected by the security mediation module 524.

To simplify the discussion, flow rules are referred to herein as having two main parts: match criteria and actions. The match criteria determine whether a flow rule applies to a particular data packet. The match criteria include a number of match fields, including those that specify source and destination criteria for matching data packets to the flow rule. The source and destination match fields each identify particular computing resources by any suitable references or identifiers, such as IP addresses, network masks, ports, and the like. In some embodiments, match fields other than source and destination may be used to evaluate the applicability of a flow rule to a data packet, and in some embodiments, one match criterion or multiple match criteria may be used.

A flow rule may contain one or more actions. The action(s) contained in the flow rule specify what action(s) are to be taken by a network switch if the flow rule applies to a particular data packet; that is, if the values of the match fields of the flow rule match the values of the corresponding match fields in the header of the data packet. An action may specify a disposition for the data packet, for example, to drop, forward, or modify the data packet. Some flow rules may specify that the data packet's header information is to be modified or rewritten, e.g., using a "set" action (in OpenFlow terminology), if the flow rule applies to the packet. Some flow rules may specify that the data packet is to be forwarded to the network controller for further analysis.

The illustrative security mediation module 524 validates the sources of the network-executable actions 132 (e.g., packet disposition directives or flow rules), analyzes the network-executable actions 132 for conflicts with existing network policies 228 and/or already-instantiated network-executable actions 132, and performs conflict resolution. The security mediation module 524 detects and resolves conflicts quickly, allowing for real-time or near-real time control of the network-executable actions 132. The illustrative security mediation module 524 is embodied as a number of computerized modules and data structures (e.g., software, firmware, hardware, or a combination thereof), which may execute or be resident on the same computing device or group of computing devices as a network flow controller, and/or on one or more other computing devices that are connected to the network 150.

To receive network-executable actions 132 from the security initiative translator module 510, the security mediation module 524 may include one or more network communication interfaces. For example, network-executable actions 132 may be received from the security initiative translator module 510 using an application programming interface (API), such as a northbound API of a network flow controller and/or the security mediation module 524. Network-executable actions 132 may be received from the security initiative translator module 510 using an inter-process communication mechanism such as pipes, sockets, or the like. For example, network-executable actions 132 may be received through a secure sockets layer (SSL) communication from the security initiative translator module 510.

The illustrative security mediation module 524 maintains the current status of the network security policies 228, as well as switch state data 528. The switch state data 528 tracks the current state of the network policies 228 on the network 150, as it changes over time during the operation of the network 150. The switch state data 528 thus stores data relating to the currently active network-executable actions 132. The switch state data 528 also stores data relating to security roles and data relating to the current state of each of the local flow tables 162 of the switches 160 as it changes over time during the operation of the network 150.

The illustrative conflict analyzer module 526 is configured to detect and resolve conflicts between network-executable actions 132 generated by the interaction handling subsystem 122 as a result of user interaction with the visualization 114 and the then-current security policies 228 and/or switch state data 528. Acceptable network-executable actions 132 are implemented on the switches 160. Additional examples of technology that may be used to implement the components of the security mediation module 524 are described in the aforementioned U.S. Patent Application Publication No. 2014/0075519 ("Security Mediation for Dynamically Programmable Network").

Figure 6A:
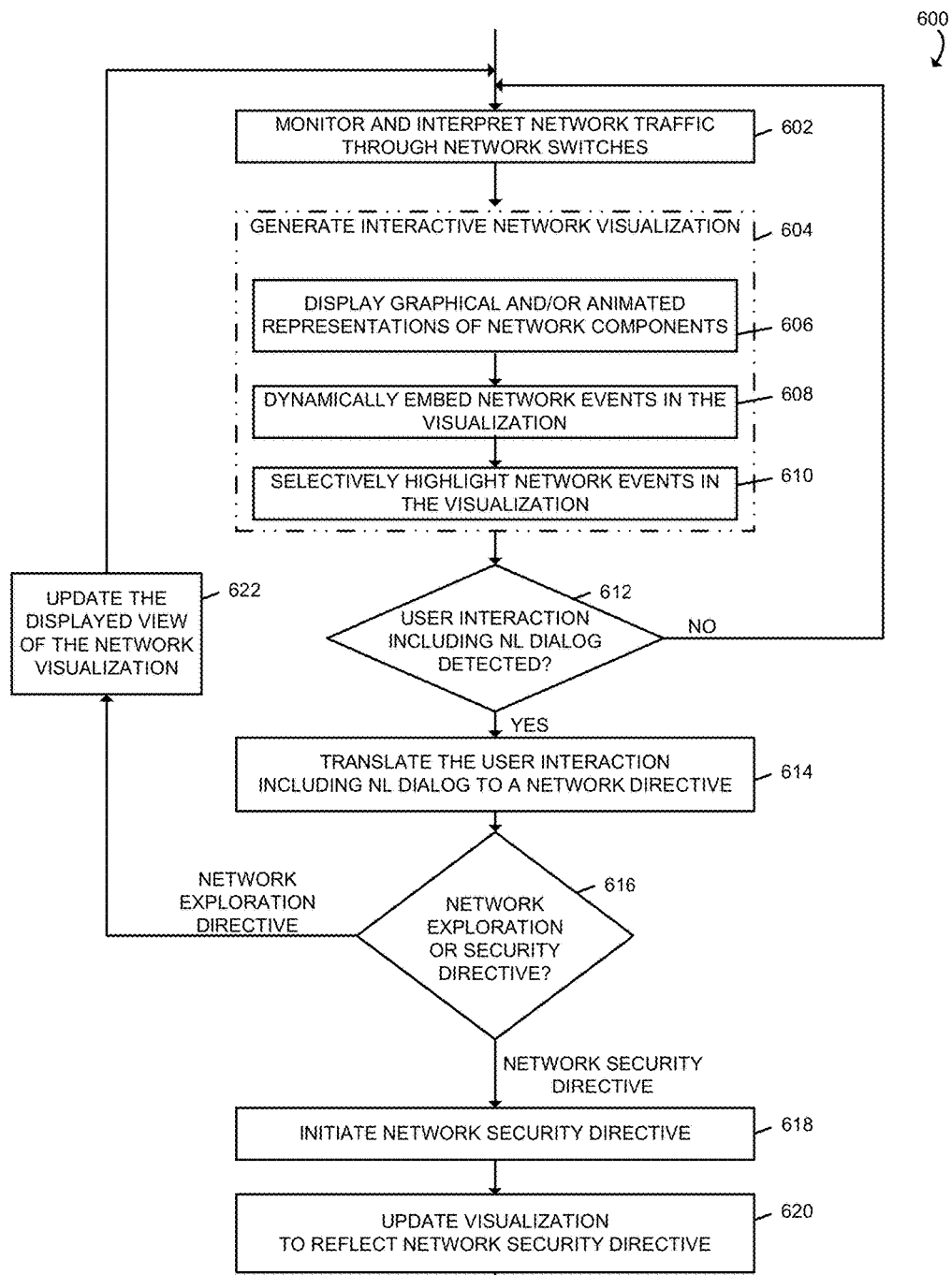
FIG. 6A is a simplified flow diagram of at least one embodiment of a method by which the computing system of FIG. 1 may provide an interactive visualization of a computer network and initiate network directives.

Referring now to FIG. 6A, an illustrative method 600 for generating an interactive network visualization and initiating network security directives is shown. The method 600 may be embodied as computerized programs, routines, logic, and/or instructions of the computing system 100, e.g., hardware, firmware, software or a combination thereof (e.g., software written using a programming language such as Java and/or Python), as part of the various components of the network security management system 110, for example. In block 602, the computing system 100 monitors and interprets network traffic passing through the network switching devices (e.g., switches 160). To do this, one or more of the components of the network analytics subsystem 142, described above, may analyze network activity data (e.g., data 140) (alone or in combination with information provided by the network model 192) and correlate the network activity data with network intelligence data, such as network topology data, infection profile data, IP reputation data, and/or other current, historical, and/or predictive information about the behavior of the network 150. Such data may be obtained from systems that are internal or external to the network security management system 110 and used by the computing system 100 to determine the current network context (e.g., context 144).

Block 604 represents a number of functions or processes that may be performed concurrently or iteratively in some embodiments, to generate and update the interactive network visualization (e.g., visualization 114) responsively to the current network context (e.g., context 144), network events, and user interactions 120. In block 606, the computing system 100 displays graphical and/or animated representations of network components in the current network context. To do this, the system 100 maps characteristics of the current network context to associated graphical elements, utilizing portions of the network model 192 as needed, and creates or updates the visualization, accordingly. The visualization 114 may be generated based on any of the data provided by the source(s) of network information 190, including the current context information provided by the network analytics subsystem 142 and/or portions of the network model 192. In block 608, the computing system 100 dynamically embeds graphical elements representative of network events in the visualization generated in block 606. The display of graphical elements indicative of network events changes over time as new network events appear and older network events are remediated or discontinue for other reasons, in block 608. For example, in block 610, nodes or flows on the network visualization may be highlighted dynamically in response to the occurrence of network events or un-highlighted in response to the network events being remediated (e.g., by user interactions 120).

At block 612, the computing system 100 determines whether a user interaction with the network visualization has occurred. To do this, the computing system 100 may read data output by one or more of the user interaction detection devices (e.g., devices 106) and interpret the user interaction data using, e.g., one or more interaction models (e.g., models 414, 416). If the computing system 100 does not detect a relevant user interaction in block 612, the computing system 100 continues the dynamic display of the interactive visualization, by returning to block 602. If the computing system detects a user interaction with the visualization, in block 612, the system 100 translates the user interaction to a network directive, in block 614. To do this, the computing system 100 may utilize an interaction model (e.g., models 414, 416) to interpret the user interaction as either a request to manipulate the view of the visualization or a request to initiate a security-related action. The computing system 100 may further utilize techniques such as those described in connection with FIG. 5 above to translate the user interaction to an action that can be directly implemented on the network, e.g., one or more device-executable instructions.

In block 616, the computing system 100 branches in one of two directions, depending on the interaction type. If the computing system 100 interprets the user interaction as a network exploration directive (e.g., a request to manipulate the view of the visualization), the computing system 100 branches to block 622. If the computing system 100 interprets the user interaction as a network security directive (e.g., a security policy update or a device-executable instruction), the computing system 100 initiates the implementation of the network security directive, in block 618. To do this, the computing system 100 may send a security policy update to a system or database that manages the network security policy, or the computing system 100 may send device-executable instructions directly to networks devices (e.g., switches 160 and/or nodes 170). In block 620, the computing system 100 updates the visualization generated in block 604 to include or modify graphical elements of the visualization as may be needed in order to reflect the initiation of the security directive as performed in block 618. Following block 620, the computing system 100 may, for example, return to block 602 or end.

Figure 6B:
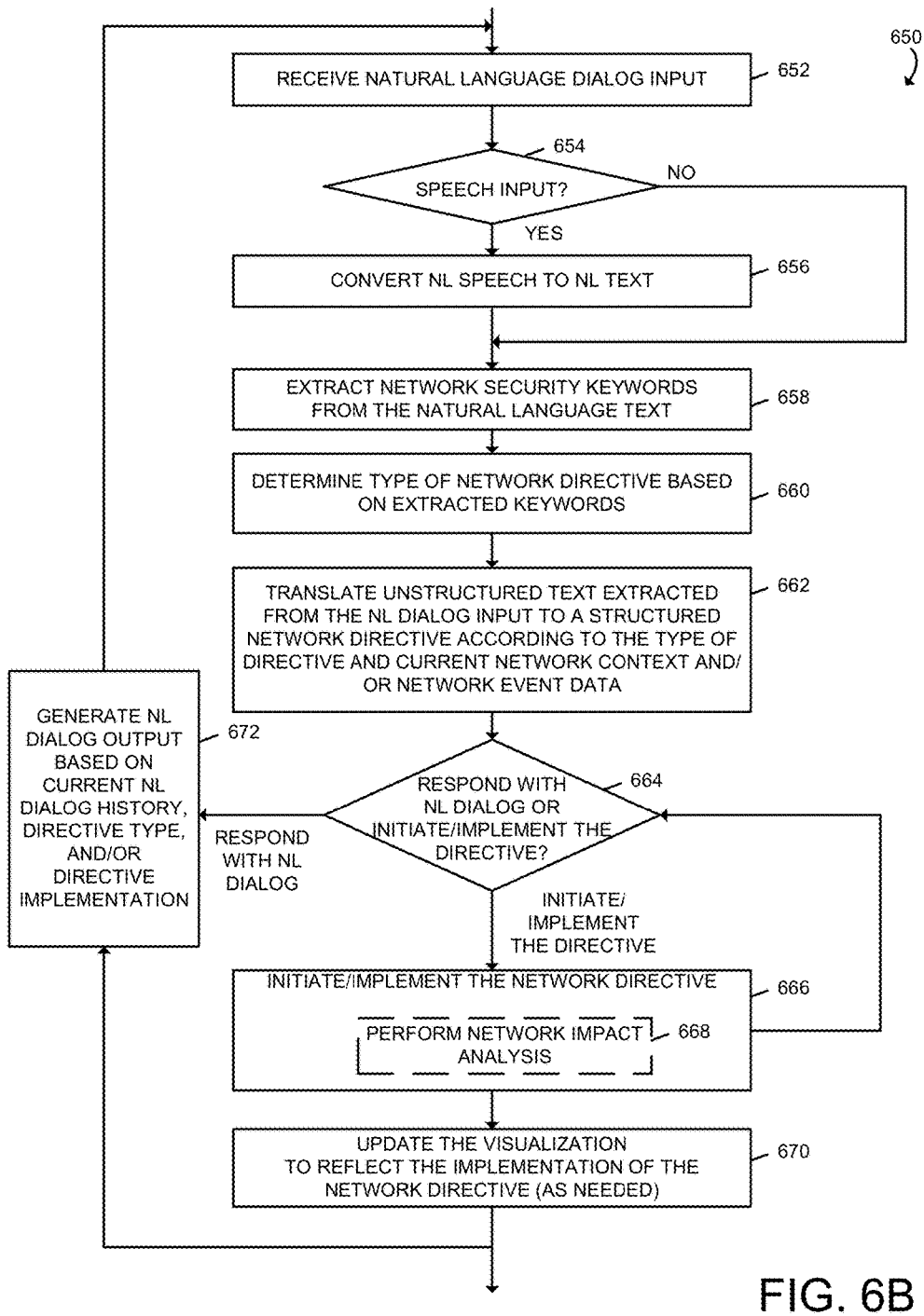
FIG. 6B is a simplified flow diagram of at least one embodiment of a method by which the computing system of FIG. 1 may handle natural language input relating to computer network security.

Referring now to FIG. 6B, an illustrative method 650 for handling natural language dialog input relating to computer network security is shown. The method 650 may be embodied as computerized programs, routines, logic, and/or instructions of the computing system 100, e.g., hardware, firmware, software or a combination thereof (e.g., software written using a programming language such as Java and/or Python), as part of the various components of the network security management system 110, e.g., the NL dialog subsystem 190. In block 652, the computing system 100 receives natural language dialog input from a user of the network security management system 110, e.g., via a microphone or chat window. In block 654, the system 100 determines whether the input received in block 652 includes speech (e.g., spoken natural language dialog). If the input received in block 652 includes speech, the system 100 converts the natural language speech to natural language text, in block 656. To do this, the system 100 performs automated speech recognition to process the acoustic speech signals and determine the words and phrases contained in the speech input (using, e.g., the automated speech recognition subsystem 420). Following block 656, or if the input received in block 652 does not contain speech (e.g., includes only natural language dialog in text form, as may be input during an online chat session), the system 100 proceeds to block 658.

In block 658, the system 100 extracts network security-related key words or phrases (e.g., keyphrases 430) from the NL input received in block 652 or NL speech converted to NL text in block 656, as the case may be. To do this, the system 100 accesses and applies network security domain-specific rules, templates, or data relationships implemented as an ontology, for example, to identify and extract key phrases of the input that are meaningful in the context of computer network security, such as queries for information about the network or one or more network components, network security commands, and/or other types of network-related requests. As used herein, "extract" may refer to, for example, an information extraction process in which words or phrases are tagged with identifiers or copied and stored e.g., in a data structure. In block 660, the system 100 determines, based on the key phrases identified and extracted in block 658, the type of network directive that is evidenced by the extracted words and/or phrases. For example, the system 100 may determine that based on the extraction of the phrase, "tell me," the network directive type is a query, from which a network exploration directive 118 may be formulated. As another example, if the word "quarantine" is extracted, the system 100 may classify the input as corresponding to a directive type of "command" from which a network security initiative 124 may be formulated.

In block 662, the system 100 translates the relatively unstructured text extracted from the NL input in block 658 to a structured network directive (e.g., to a network exploration directive 118 or network security initiative 124), as the case may be, according to the network directive type determined in block 660. In formulating the network directive (e.g., a network exploration directive 118 or network security initiative 124), the system 100 may consider the current network context 144, network event indicators 146, and/or other data (e.g., impact assessment data 148). For instance, the system 100 may utilize the current network context 144 to supply one or more arguments for the structured network directive (such as IP addresses of machines involved in a problematic data flow).

In block 664, the system 100 evaluates the network directive and determines whether to respond with system-generated NL dialog output or to proceed with initiating or implementing the network directive. For instance, if the system 100 has a low confidence (e.g., less than a threshold confidence level) in the accuracy of its interpretation of the NL input (as performed in block 662), the system may proceed to block 672 and respond by outputting NL dialog asking the user for further clarification of the request. The system 100 initiates or implements the directive, in block 666, if, for example, no clarification of the NL input is needed (e.g., the system 100 has a high confidence, e.g., greater than a threshold value), that its interpretation prepared in block 662 is accurate). Initiation or implementation of the directive created in block 662 may involve, in block 666, executing one or more queries, analyzing the current network context 144, analyzing network event indicators 146, analyzing impact assessment data 148, or implementing one or more network-executable actions 132. For instance, in block 668 the system 100 may perform a network impact analysis of a requested network-executable action 132 and provide the results of the network impact analysis to the user by returning to blocks 664 and 672, prior to implementing the network-executable action 132 (and then if subsequent NL dialog is received from the user authorizing the network-executable action 132 after the system 100 has provided the impact analysis data in a round of dialog, the system 100 may return to block 666 and implement the network-executable action 132). In block 670, the system 100 updates the visualization (e.g., the visualization 114) as needed to reflect the implementation of the network directive, as performed by the system 100 in block 666. For instance, if in block 666 the system 100 executes a network-executable action 132 to quarantine a network node, the system 100 may in block 670 update the graphical elements of the visualization 114 to indicate graphically in the visualization 114 that the node is now quarantined. Following block 670, the system 100 may proceed to block 672, proceed to return directly to block 652, or end the execution of the method 650. In block 672, the system 100 may output system-generated NL dialog to inform the user that the requested directive has been executed, or provide other NL dialog output as needed. Following block 672, the system 100 may return to block 652 to await another instance of NL dialog input from the user, or end the method 650.

Figure 7A:
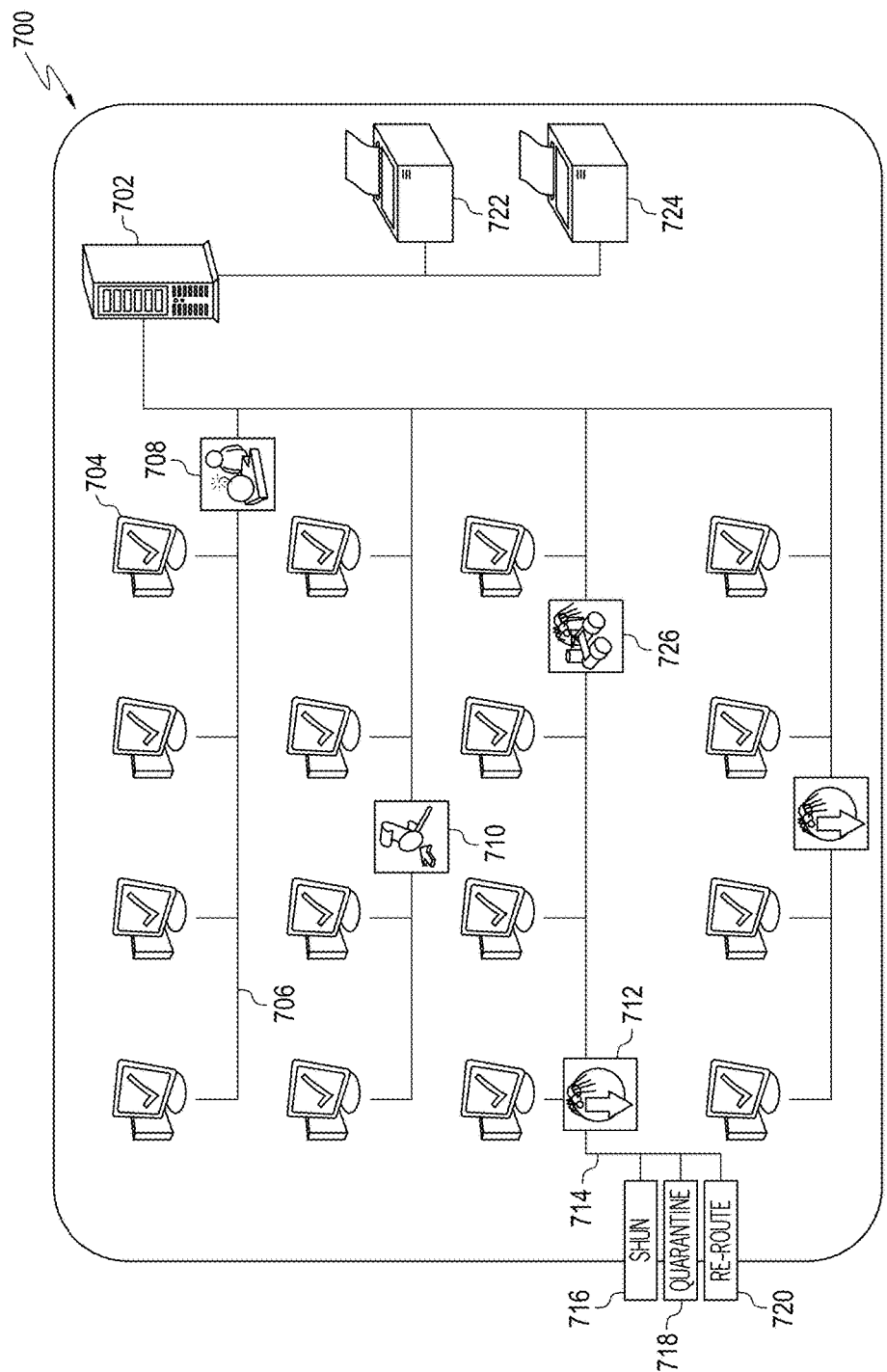
FIGS. 7A-7E are illustrative example embodiments of interactive visualizations of a computer network as disclosed herein.

Referring now to FIGS. 7A-7E, illustrative examples of interactive network visualizations as disclosed herein are shown. In FIG. 7A, an interactive visualization 700 illustrates the current context of a network, including the network topology, and the links connecting nodes and peripheral devices. The visualization 700 includes icon-like graphical elements that allow the user to easily (e.g., visually or haptically) distinguish the different types of devices on the network (e.g., client devices 704, a server 702, and peripheral devices 722, 724). The visualization 700 also allows the user to quickly identify which portions of the network are at risk and which portions are currently running normally. For example, the desktop computer icons are overlaid with check marks if the client node is currently running normally. The check mark may be removed if the status of the node changes. Additionally, intuitive icon-like graphical elements are used to allow the user to quickly identify various different types of network threats, as indicated by the graphical elements 708, 710, 712, 726. Each of the graphical elements 708, 712, 726 presents a different graphic to represent a different type of network threat. The visualization 700 is interactive using, e.g., touch-based technology. As illustrated by graphical elements 712, 714, 716, 718, 720, tapping on the icon 712 causes the visualization 700 to present the user with remediation options 716, 718, 720 and the graphical connector 714 allows the user to easily see that these options 716, 718, 720 would affect the node associated with the threat icon 712.

Figure 7B:
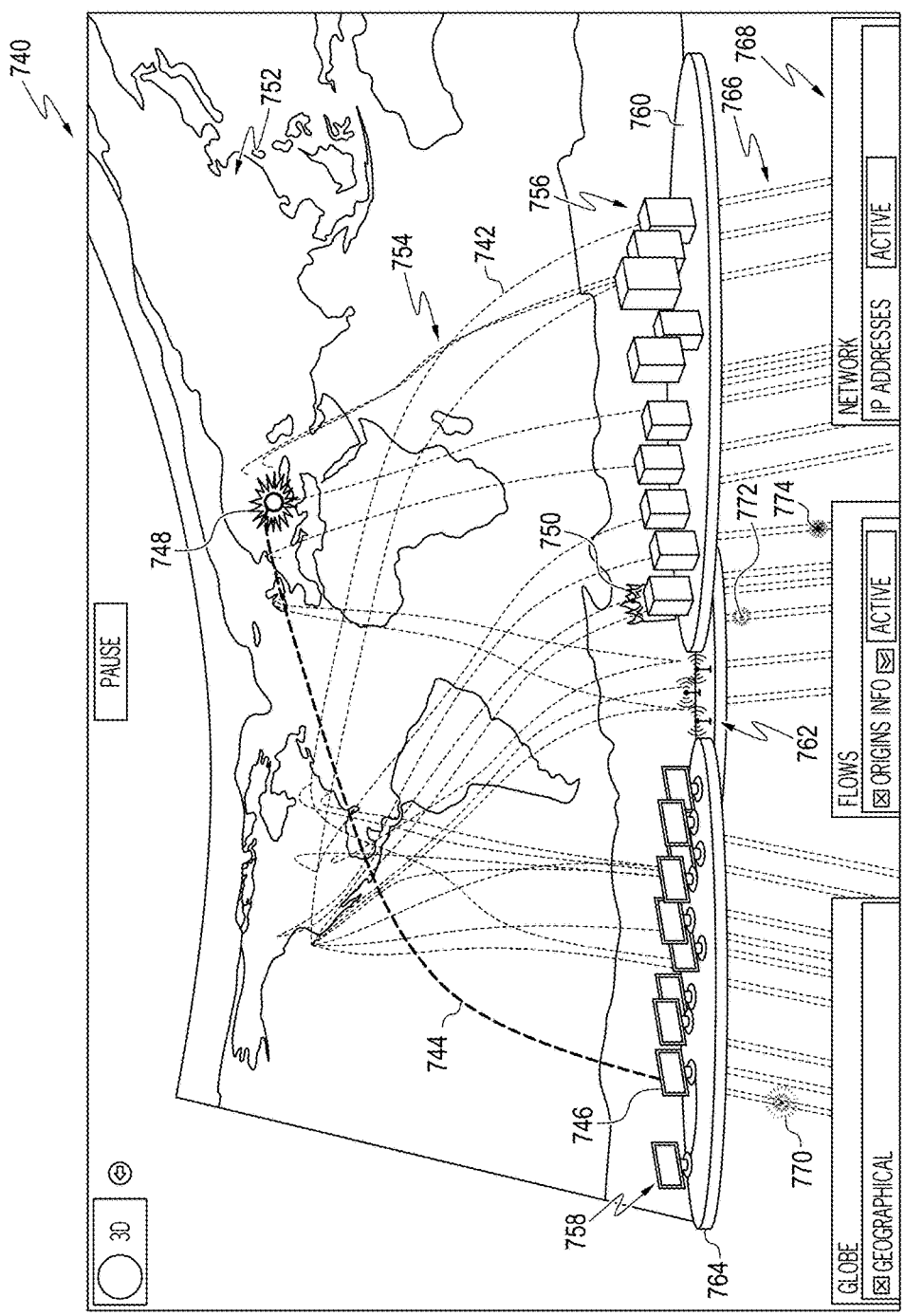

Referring now to FIGS. 7B, 7C, 7D, and 7E, multiple different exemplary views of a three-dimensional, virtual world, game-like visualization of a computer network are shown. Each of the FIGS. 7B, 7C, 7D, and 7E shows a different presentation of the same computer network from a different point of reference. The point of reference can be changed intuitively by user interactions such as gestures, or by combinations of user interactions such as gestures and speech or machine-assisted speech (e.g., by an assistive speech device). In the view 740, the nodes on the network administrator's network are arranged by node type, on different "plates." For example, servers 756 are presented on a plate 760, client devices 758 are presented on a plate 764, and wireless devices 762 are presented on a plate 763. The graphical elements used to depict the nodes intuitively identify the device type. The current network flows between the internal nodes 758, 762, 756 and external nodes are shown by flow lines 754, e.g., line 742 and line 744. The geographic locations of the external nodes with which the internal nodes are currently communicating are illustrated intuitively by a geographic map 752. Thus, the network administrator can quickly see whether any nodes are connecting with external nodes in a geographic region that may be of concern from a network security perspective. In the illustrative example, the node 746 has connected with an at risk external node 748. This network event is depicted by graphical elements highlighting the at risk node 748 and also the network flow 744. In some embodiments, the network flows, e.g., lines 742, 744, may be animated to show the direction of flow (e.g., from source to destination). Another network event is indicated by highlighting the node 750 (e.g., "on fire"). Also shown in FIG. 7B are textual data indicative of the current network context, 768, and connection duration graphics 766. The illustrative connection duration graphics 766 indicate the length of time that a node has been connected to another node using a "waterfall" approach in which the length of the graphical elements 766 is representative of the length of time of the connection (e.g. longer length of waterfall corresponds to longer connection time and vice versa). Graphical elements 770, 772, and 774 indicate network events occurring during these connections 766 and the connections 766 associate the events 770, 772, 774 with their respective nodes.

Figure 7C:
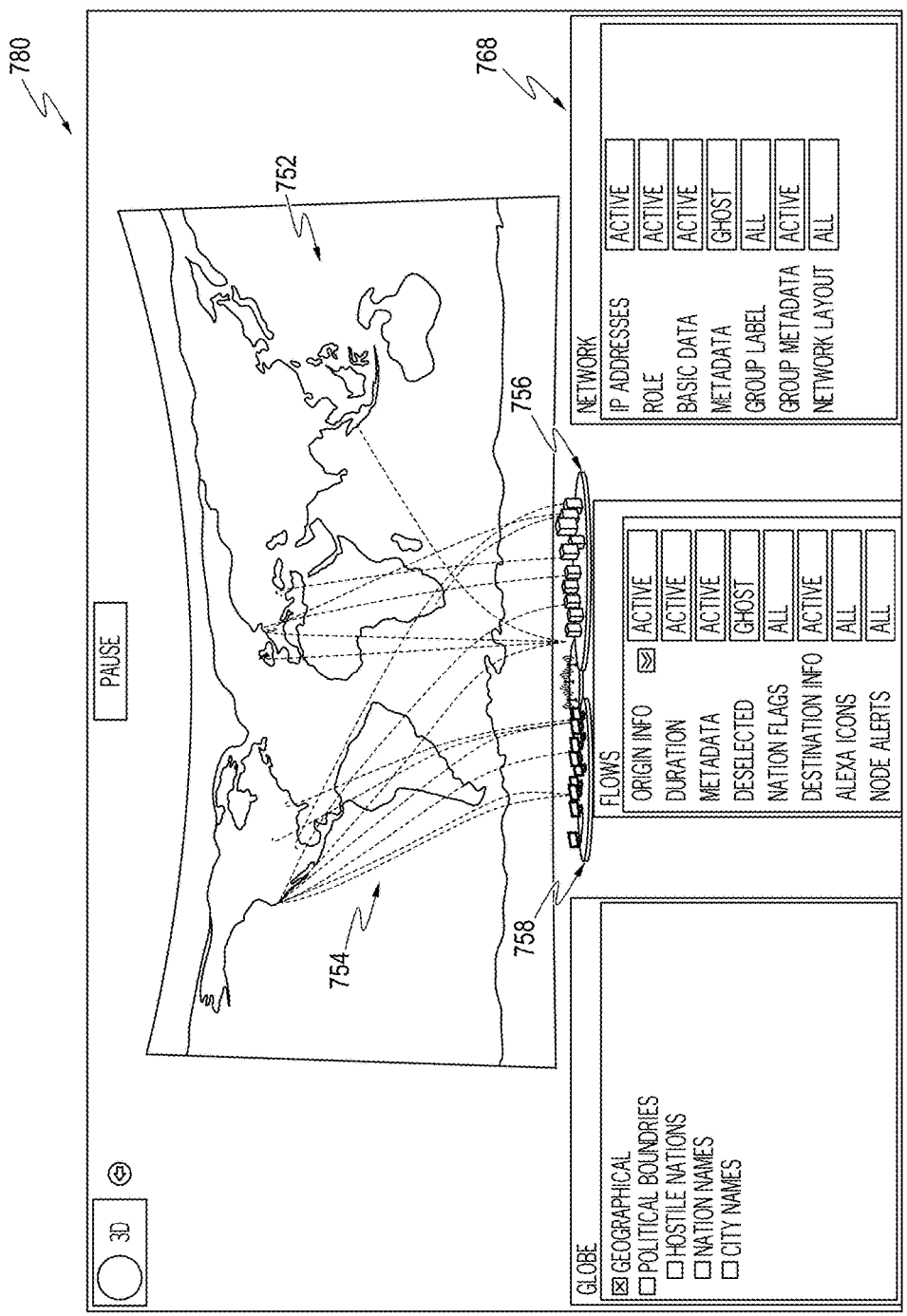
Figure 7D:
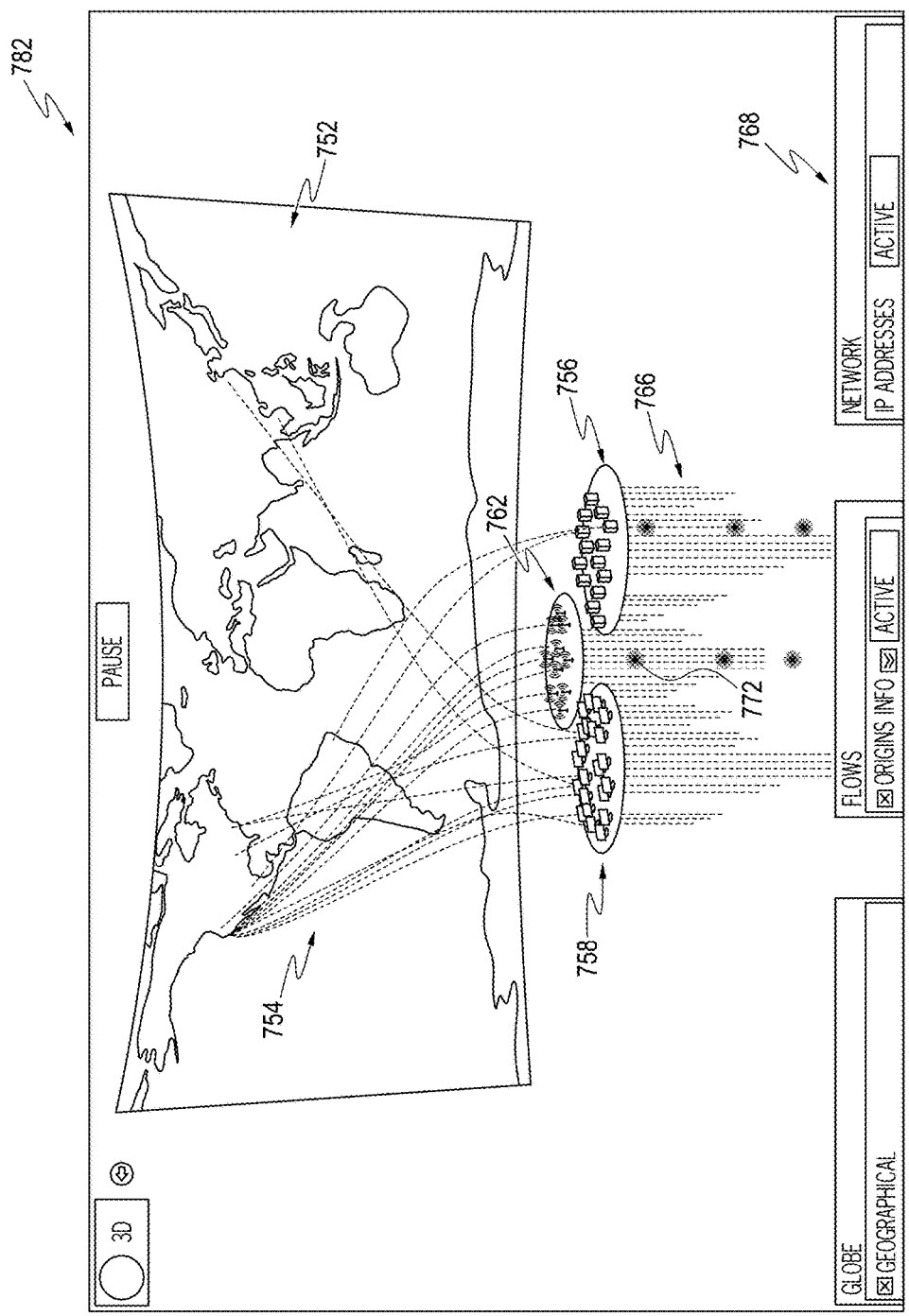
Figure 7E:
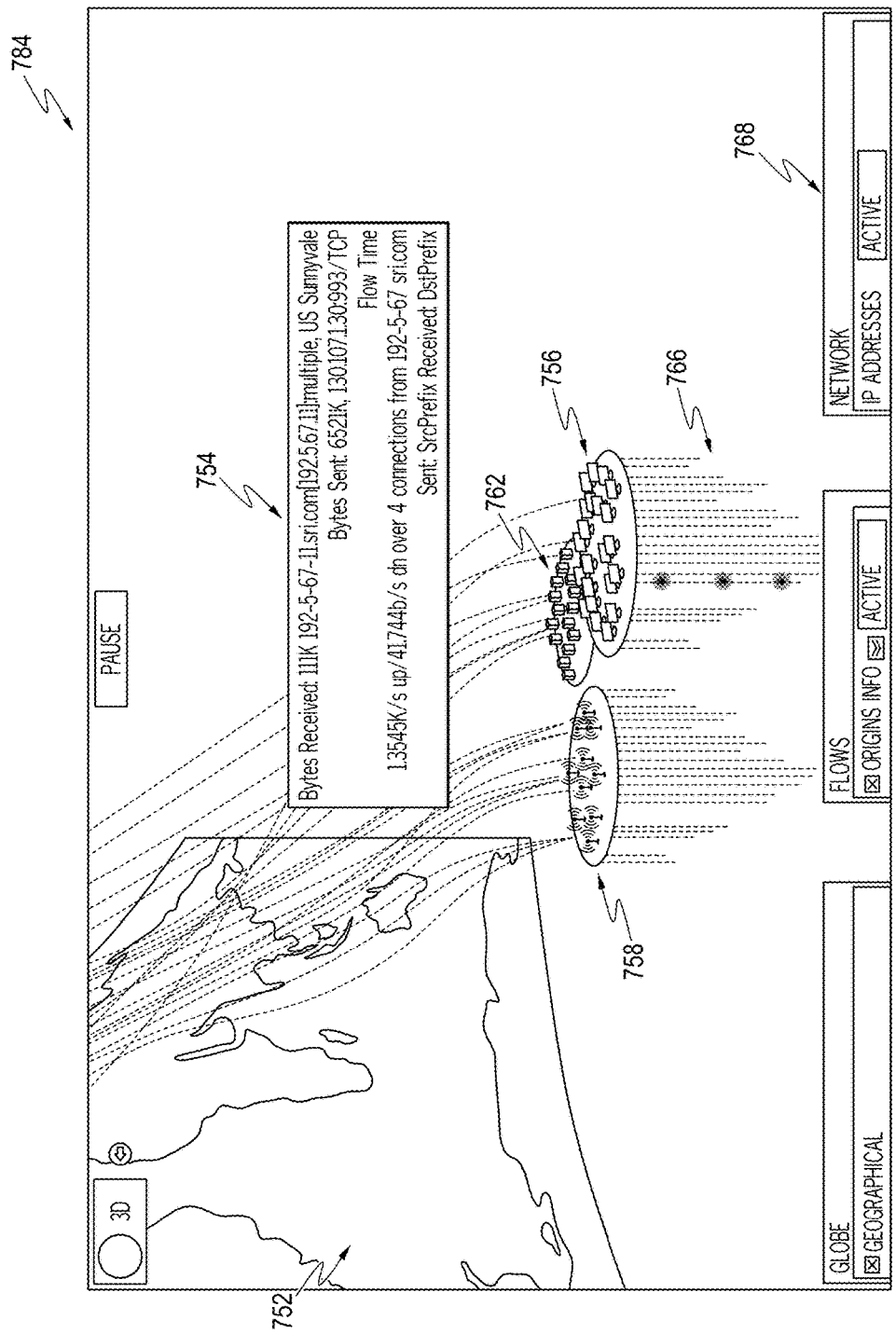

The view 780 of FIG. 7C illustrates a "zoomed out" view of the network shown in FIG. 7B. The user can cause the visualization to move from the view of FIG. 7A to the view of FIG. 7B by a simple gesture or other intuitive form of user interaction with the computing system 100. As such, the view 780 shows more of the textual details 768, which are reflective of the current network context. The view 782 of FIG. 7D shows a "zoomed out" view of the network shown in FIG. 7B. In the view 782, the user can easily see the connection duration information 766. Again, moving from either of the views 740, 780 to the view 782 can be initiated by a gesture-based interaction. The view 784 of FIG. 7E illustrates the interactive capabilities of the visualization, in that tapping on the display screen (or performing some other type of gesture-based interaction) results in the display of current network context details 754 relating to a specific network flow. Thus, if the network administrator needs more information about any of the flows represented by graphical elements, the administrator may simply tap on or point to the flow of interest and the system 100 displays the current context details 754. It should be noted that the current context details 754 are updated in response to changing network conditions, e.g., in real time or as the network analytics subsystem 142 described above updates the current network context 144 and network event indicators 146.

Figure 8:
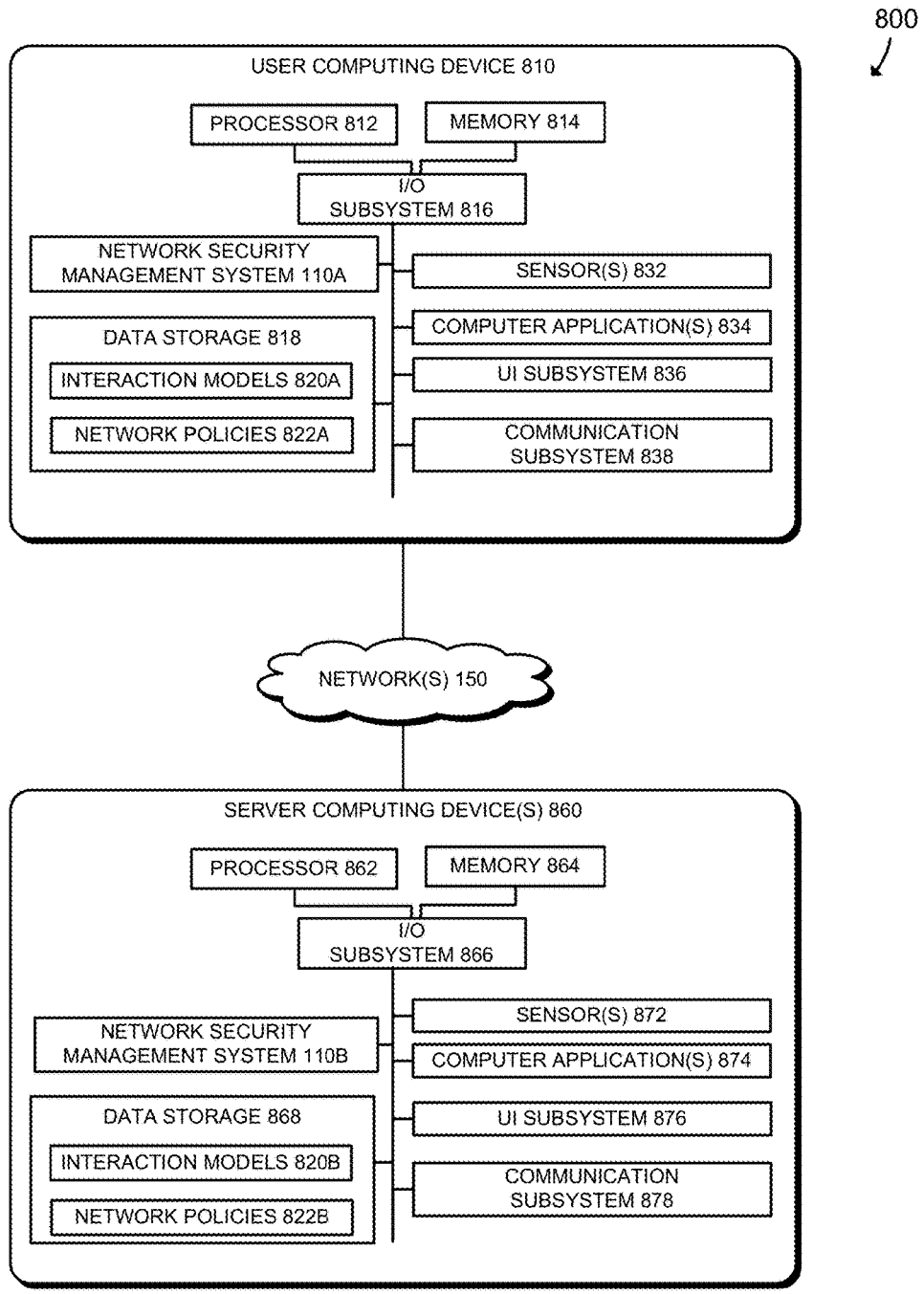
FIG. 8 is a simplified block diagram of an exemplary computing environment in connection with which at least one embodiment of the network security management system of FIG. 1 may be implemented.

Referring now to FIG. 8, a simplified block diagram of an embodiment 800 of the computing system 100 is shown. While the illustrative computing system 800 is shown as involving multiple computing devices, it should be understood that in some embodiments, the computing system 800 may constitute a single computing device, alone or in combination with other devices. The computing system 800 includes a user computing device 810, which may be in communication with one or more server computing devices 860 via one or more networks or honeynets 150. The network security management system 110, or portions thereof, may be distributed across multiple computing devices 810, 860 that are connected to the network(s) 150 as shown. In other embodiments, however, network security management system 110 may be located entirely on the computing device 810. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a network application, a network controller, a network switching device, and/or other systems and devices.

The illustrative computing device 810 includes at least one processor 812 (e.g. a microprocessor, microcontroller, digital signal processor, etc.), memory 814, and an input/output (I/O) subsystem 816. The computing device 810 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of hardware and software components and/or other computing systems including a "front end" of the network security management system 110A, a user interface subsystem 836, which includes one or more user input devices (e.g., one or more microphones, touchscreens, keyboards, virtual keypads, etc.) and one or more output devices (e.g., speakers, displays, LEDs, haptic devices, etc.). The I/O subsystem 816 is also communicatively coupled to a number of sensors 832 (e.g., user interaction detection devices 106), one or more data storage media 818, and a communication subsystem 838. It should be understood that each of the foregoing components and/or systems may be integrated with the computing device 810 or may be a separate component or system that is in communication with the I/O subsystem 816 (e.g., over a network 150 or a serial bus connection).

The data storage media 818 may include one or more hard drives or other suitable data storage devices (e.g., flash memory, memory cards, memory sticks, and/or others). In some embodiments, portions of the network security management system 110A, interaction models 820A (e.g., models 414, 416), network policies 822B (e.g., policies 228) and/or other data (e.g., network activity data 140, network topology data 220, infection profile data 222, IP reputation data 224, network role data 226, mapping 328, repository 330, rules and templates 332, 334) and/or other data reside at least temporarily in the data storage media 818. Portions of the network security management system 110A and/or other data may be copied to the memory 814 during operation of the computing device 810, for faster processing or other reasons.

The communication subsystem 838 may communicatively couple the computing device 810 to one or more communication networks 150, e.g., a local area network, wide area network, personal cloud, enterprise cloud, public cloud, and/or the Internet, for example. Accordingly, the communication subsystem 838 may include one or more wired or wireless network interface software, firmware, or hardware, for example, as may be needed pursuant to the specifications and/or design of the particular computing system 100.

The server computing device(s) 860 may be embodied as any suitable type of computing device capable of performing the functions described herein, such as any of the aforementioned types of devices or other electronic devices. For example, in some embodiments, the server computing device(s) 860 may include one or more server computers including data storage media 768, which may be used to store "back end" portions of the network security management system 110B, interaction models 820B (e.g., models 414, 416), network policies 822B (e.g., policies 228) and/or other data (e.g., network activity data 140, network topology data 220, infection profile data 222, IP reputation data 224, network role data 226, mapping 328, repository 330, rules and templates 332, 334). The illustrative server computing device 860 includes one or more processors 862, memory 864, an I/O subsystem 866, data storage media 868, sensors 872, computer applications 874, a user interface subsystem 876, and a communication subsystem 878, each of which may be embodied similarly to the corresponding components of the user computing device 810, respectively, described above. The computing system 800 may include other components, sub-components, and devices not illustrated in FIG. 8 for clarity of the description. In general, the components of the computing system 800 are communicatively coupled as shown in FIG. 8 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a network management system includes one or more computing devices configured to: determine a current context of a computer network in live operation; generate an interactive visualization of the network, the interactive visualization comprising a plurality of graphical elements arranged to depict the current context of the network, at least one of the graphical elements indicative of a network security event detected on the network; receive a non-speech input of a user in relation to at least one of the graphical elements of the interactive visualization; receive conversational natural language speech input from the user; interpret a combination of inputs comprising at least the non-speech input and the conversational spoken natural language input as a network security directive responsive to the network security event; and convert the network security directive to a set of instructions executable by one or more switching devices of the computer network.

An example 2 includes the subject matter of example 1, and is configured to determine the current context of the network at least in part by algorithmically correlating network activity data indicative of live data flows on the network with one or more of: network event or infection data generated by one or more network analytics systems, network role data, network topology data, and network policy data. An example 3 includes the subject matter of example 1 or example 2, and is configured to interpret the non-speech input as selecting, on the visualization, a graphical element representative of a node on the network, interpret the combination of inputs as a command relating to the selected node, and convert the command to a set of instructions executable by the management system. An example 4 includes the subject matter of any of examples 1-3, and is configured to interpret the non-speech input as selecting, on the visualization, a graphical element representative of a live data flow on the network, interpret the combination of inputs as a command relating to the selected data flow, and convert the command to a set of instructions executable by the network. An example 5 includes the subject matter of any of examples 1-4, and is configured to interpret the non-speech input as selecting, on the visualization, a graphical element representative of a node on the network, interpret the combination of inputs as a query relating to the selected node, execute the query, and update the visualization to display one or more results of the query in relation to the selected graphical element. An example 6 includes the subject matter of any of examples 1-5, and is configured to interpret the non-speech input as selecting, on the visualization, a graphical element representative of a live data flow on the network, interpret the combination of inputs as a query relating to the selected data flow, execute the query, and update the visualization to display one or more results of the query in relation to the graphical element. An example 7 includes the subject matter of any of examples 1-6, and is configured to interpret the combination of inputs comprising at least the non-speech input and the natural language input as a network security remediation action, wherein the network security remediation action comprises one or more of: a disabling of or a redirection of one or more network flows, a quarantine of one or more internal nodes of the network, a replication of network traffic, a diversion of one or more network flows away from an external node, a diversion of one or more network flows to an external node, and a reconfiguration of a switching device on the computer network. An example 8 includes the subject matter of example 7, and is configured to convert the network security remediation action to a set of packet disposition directives executable by one or more switching devices of the computer network, wherein the computer network is configured as a software-defined network.

In an example 9, a method for network management includes, with one or more computing devices: determining a context of a computer network in live operation; generating an interactive visualization of the network, the interactive visualization comprising a plurality of graphical elements arranged to depict the context of the network; receiving a non-speech input of a user in relation to at least one of the graphical elements of the interactive visualization of the network; receiving conversational natural language input from the user; interpreting a combination of inputs comprising at least the non-speech input and the natural language input as a network directive relating to one or more components of the network; and converting the network directive to a set of instructions executable by a network management system.

An example 10 includes the subject matter of example 9, and includes determining the context of the network at least in part by algorithmically correlating network activity data indicative of live data flows on the network with one or more of: network event or infection data generated by one or more network analytics systems, network role data, network topology data, and network policy data. An example 11 includes the subject matter of example 9 or example 10, and includes interpreting the combination of inputs as a command relating to a graphical element representative of one or more nodes and/or data flows on the network, and converting the command to a set of instructions executable by one or more network management systems. An example 12 includes the subject matter of any of examples 9-11, and includes interpreting the combination of inputs as a query relating to a graphical element representative of one or more nodes and/or data flows on the network, and converting the query to a set of instructions executable by one or more components of a network analytics subsystem, wherein the one or more components of the network analytics subsystem is in communication with the network. An example 13 includes the subject matter of any of examples 9-12, and includes interpreting the combination of inputs comprising at least the non-speech input and the conversational natural language input as a network security remediation action, wherein the network security remediation action comprises one or more of: a redirection of one or more network flows, a quarantine of one or more internal nodes of the network, a replication of network traffic, a diversion of one or more network flows away from an external node, a diversion of one or more network flows to an external node, and a reconfiguration of a switching device on the computer network, and converting the network security remediation action to a set of instructions executable by one or more devices of the computer network. An example 14 includes the subject matter of any of examples 9-13, and includes displaying a view of the interactive visualization of the network; and interpreting the combination of inputs comprising at least the non-speech input and the conversational natural language input as a request to manipulate the view of the visualization.

In an example 15, a network management system includes, embodied in one or more non-transitory machine accessible storage media, instructions configured to cause one or more computing devices to: generate an interactive visualization of a computer network, the interactive visualization comprising a plurality of graphical elements arranged to depict the live operation of the network; receive a non-speech input of a user in relation to at least one of the graphical elements of the interactive visualization of the computer network; receive conversational natural language input from the user; interpret a combination of inputs comprising at least the non-speech input and the conversational natural language input as a network directive relating to one or more components of the network; and convert the network directive to a set of instructions executable by one or more devices of the network.

An example 16 includes the subject matter of example 15, and includes instructions configured to identify a network event on the network at least in part by algorithmically correlating network activity data indicative of live data flows on the network with one or more of: network infection data generated by one or more network analytics systems, network role data, network topology data, and network policy data, and interpret the combination of inputs comprising at least the non-speech input and the natural language input as a network security directive relating to the identified network event. An example 17 includes the subject matter of example 16, and includes, instructions configured to interpret the combination of inputs as a command relating to one or more nodes and/or data flows involved in the network event. An example 18 includes the subject matter of example 16 or example 17, and includes instructions configured to interpret the combination of inputs as a query relating to the identified network event. An example 19 includes the subject matter of any of examples 16-18, and includes instructions configured to display a view of the interactive visualization of the network and manipulate the view of the visualization in response to the combination of inputs comprising at least the non-speech input and the conversational natural language input. An example 20 includes the subject matter of any of examples 16-19, and includes instructions configured to interpret the combination of inputs comprising at least the non-speech input and the conversational natural language input as a command to: redirect one or more data flows on the network, quarantine one or more nodes of the network, divert one or more network flows away from a node, divert one or more network flows to a node, or reconfigure a switching device on the computer network.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof (e.g., software written using a programming language such as Java and/or Python). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A system comprising, embodied in one or more non-transitory machine accessible storage media, instructions configured to cause one or more computing devices to:
generate an interactive visualization of a computer network, the interactive visualization comprising a plurality of graphical elements arranged to depict the operation of the network;
receive unstructured conversational spoken natural language input in relation to at least one of the graphical elements of the interactive visualization;
interpret a combination of inputs comprising at least non-verbal data relating to the interactive visualization and the unstructured conversational spoken natural language input as a structured network directive relating to one or more components of the network; and
convert the structured network directive to a set of instructions executable by one or more devices of the network.

2. The system of claim 1, comprising instructions configured to identify a network event on the network at least in part by algorithmically correlating network activity data indicative of data flows on the network with one or more of: network infection data generated by one or more network analytics systems, network role data, network topology data, and network policy data, and interpret the combination of inputs comprising at least the non-speech input and the natural language input as a network security directive relating to the identified network event.

3. The system of claim 2, comprising instructions configured to interpret the combination of inputs as a command relating to one or more nodes and/or data flows involved in the network event.

4. The system of claim 2, comprising instructions configured to interpret the combination of inputs as a query relating to the identified network event.

5. The system of claim 2, comprising instructions configured to display a view of the interactive visualization of the network and manipulate the view of the visualization in response to the combination of inputs comprising at least the non-speech input and the conversational natural language input.

6. The system of claim 2, comprising instructions configured to interpret the combination of inputs comprising at least the non-speech input and the conversational natural language input as a command to: redirect one or more data flows on the network, quarantine one or more nodes of the network, divert one or more network flows away from a node, divert one or more network flows to a node, or reconfigure a switching device on the computer network.

7. The system of claim 1, comprising instructions configured to use a current view of the interactive visualization to interpret the conversational natural language input.

8. The system of claim 1, comprising instructions configured to use a model to interpret the unstructured conversational natural language input.

9. The system of claim 1, comprising instructions configured to use a model to interpret the non-verbal data.

10. The system of claim 1, wherein the interactive visualization comprises a plurality of different icon-like graphical elements representing different types of devices on the network.

11. The system of claim 1, wherein the interactive visualization comprises a plurality of different graphical elements representing different types of network threats on the network.

12. The system of claim 1, wherein the interactive visualization comprises an animated representation of a network flow.

13. The system of claim 1, wherein the interactive visualization comprises an animated representation of a direction of a network flow.

14. The system of claim 1, wherein the interactive visualization comprises an animated representation of a duration of a network connection.

15. The system of claim 1, wherein the non-verbal data comprises gaze-based interaction data.

16. The system of claim 1, wherein the non-verbal data comprises touch-based interaction data.

17. The system of claim 1, wherein the non-verbal data comprises motion-based interaction data.

18. The system of claim 1, wherein the non-verbal data comprises gesture-based interaction data.

19. The system of claim 1, comprising instructions configured to manipulate a three-dimensional view of the interactive visualization in response to the network directive.

20. A method, comprising:
generating an interactive visualization of a computer network, the interactive visualization comprising a plurality of graphical elements arranged to depict the operation of the network;
receiving unstructured conversational spoken natural language input in relation to at least one of the graphical elements of the interactive visualization;
interpreting a combination of inputs comprising at least non-verbal data relating to the interactive visualization and the unstructured conversational spoken natural language input as a structured network directive relating to one or more components of the network;
converting the structured network directive to a set of instructions executable by one or more devices of the network, wherein the method is performed by one or more computing devices.

* * * * *